(12) United States Patent
Handa et al.

(10) Patent No.: US 11,314,574 B2
(45) Date of Patent: *Apr. 26, 2022

(54) TECHNIQUES FOR MANAGING AND ANALYZING LOG DATA

(71) Applicant: Oracle International Corporation, Redwood Shores, CA (US)

(72) Inventors: Nitin Handa, Foster City, CA (US); Rohit Soni, Andover, MA (US)

(73) Assignee: Oracle International Corporation, Redwood Shores, CA (US)

( * ) Notice: Subject to any disclaimer, the term of this patent is extended or adjusted under 35 U.S.C. 154(b) by 15 days.

This patent is subject to a terminal disclaimer.

(21) Appl. No.: 16/566,804

(22) Filed: Sep. 10, 2019

(65) Prior Publication Data
US 2020/0004617 A1    Jan. 2, 2020

Related U.S. Application Data

(63) Continuation of application No. 15/699,743, filed on Sep. 8, 2017, now Pat. No. 10,452,465.

(51) Int. Cl.
*G06F 11/00* (2006.01)
*G06F 11/07* (2006.01)

(52) U.S. Cl.
CPC ........ *G06F 11/079* (2013.01); *G06F 11/0772* (2013.01); *G06F 11/0778* (2013.01)

(58) Field of Classification Search
CPC .............. G06F 11/0766; G06F 11/079; G06F 11/0772; G06F 11/0778
See application file for complete search history.

(56) References Cited

U.S. PATENT DOCUMENTS

| | | |
|---|---|---|
| 5,737,600 A | 4/1998 | Geiner et al. |
| 5,956,704 A | 9/1999 | Gautam et al. |
| 6,462,654 B1 | 10/2002 | Sandelman et al. |
| 6,591,228 B1 | 7/2003 | Hall et al. |

(Continued)

OTHER PUBLICATIONS

Exception Management, SAP Solution Manager, vol. 7.1, Available Online at: http://help.sap.com, Aug. 27, 2017, 2 pages.

(Continued)

*Primary Examiner* — Jonathan D Gibson
(74) *Attorney, Agent, or Firm* — Kilpatrick Townsend & Stockton LLP

(57) ABSTRACT

In order to provide effective diagnostics and logging of error messages produced during the execution of processes across multiple components, techniques are disclosed for the generating, managing, and processing centralized logs containing those error messages. In particular, the components may write error messages to a centralized log instead of writing the error messages to local log files. The various error messages in the centralized log can be read, identified, and organized. Furthermore, enrichments and/or analytics may be applied to the error messages based on information from a knowledge source or the application of one or more machine learning models. The organized error messages, enrichments, and analytics can be stored in an output log that can be easily retrieved and viewed through a graphical interface. The organized error messages, enrichments, and analytics work together to allow for more effective diagnosing of execution errors.

11 Claims, 10 Drawing Sheets

(56) References Cited

U.S. PATENT DOCUMENTS

| | | | |
|---|---|---|---|
| 7,263,632 B2 | 8/2007 | Ritz et al. | |
| 7,783,750 B1 | 8/2010 | Casey et al. | |
| 8,032,792 B2 | 10/2011 | Zakonov et al. | |
| 8,341,645 B1 | 12/2012 | Oxenstierna et al. | |
| 8,661,452 B2 | 2/2014 | Gandini et al. | |
| 8,892,518 B1 | 11/2014 | Kannan | |
| 9,465,684 B1* | 10/2016 | Carter | G06F 11/0778 |
| 2006/0020859 A1* | 1/2006 | Adams | G06F 11/0766 |
| | | | 714/48 |
| 2007/0179833 A1 | 8/2007 | Moorthy et al. | |
| 2014/0025995 A1* | 1/2014 | Narayanan | G06F 11/0706 |
| | | | 714/37 |
| 2014/0359019 A1 | 12/2014 | Panangipalli et al. | |
| 2015/0089018 A1* | 3/2015 | Soni | H04L 43/08 |
| | | | 709/217 |
| 2015/0242262 A1* | 8/2015 | Ranganathan | G06F 11/0778 |
| | | | 714/37 |
| 2016/0004989 A1 | 1/2016 | Reddy et al. | |
| 2016/0026521 A1 | 1/2016 | Finnigan et al. | |
| 2017/0083390 A1* | 3/2017 | Talwadker | G06F 11/0748 |
| 2018/0046529 A1* | 2/2018 | Togawa | G06F 11/0787 |
| 2018/0307551 A1* | 10/2018 | Bacha | G06F 11/0766 |
| 2019/0303231 A1* | 10/2019 | Togawa | G06F 11/0772 |
| 2019/0324831 A1* | 10/2019 | Gu | G06F 11/0775 |

OTHER PUBLICATIONS

Exception Management: Monitoring, Available Online at: http://help.sap.com/saphelp_sm71_sp08/helpdata/en/9d/f7d3a1aba04a459f528ae130331e6a/content.htm, Sep. 28, 2016, pp. 1-3.

Open Source Log Management that Actually Works, Available Online at: https://www.graylog.org/, Sep. 27, 2016, pp. 1-7.

SAP End-To-End Exception Management, SAP Solution Manager 7.1 SP05 and higher, ST-PI 2008_1 700 SP06 and higher, Aug. 29, 2017, 4 pages.

Use Cases, Available Online at: https://www.graylog.org/usecases, Sep. 27, 2016, pp. 1-4.

U.S. Appl. No. 15/699,743, Notice of Allowance dated Jun. 13, 2019, 11 pages.

Flowers, Centralized Syslogging with Syslog-NG on SUSE Linux, Available Online at: https://www.novell.com/coolsolutions/feature/18044.html, Nov. 2, 2006, pp. 1-3.

Majumdar, Enterprise Exception Handling, IBM, Websphere software, Aug. 29, 2017, pp. 1-58.

Sowa. Why Journald?, DZone Performance, Available online at: https://dzone.com/articles/whyjournald, Sep. 28, 2016, pp. 1-4.

\* cited by examiner

TECHNIQUES FOR MANAGING AND ANALYZING LOG DATA

CROSS-REFERENCE TO RELATED APPLICATION

This application is a continuation of, and claims the benefit and priority of U.S. application Ser. No. 15/699,743, filed Sep. 8, 2017, the entire contents of which are incorporated herein by reference for all purposes.

BACKGROUND

The present disclosure relates generally to managing the logging of messages (e.g., error messages) produced during the execution of processes on a computer. More specifically, techniques (e.g., systems, methods, and computer-readable media) are disclosed for the management and processing of log data for multiple processes, and for the analysis of messages that arise during execution of those processes.

For example, errors frequently arise during the execution of processes on a computer. Some errors can be serious (e.g., errors that halt the execution of the processes or disrupt other processes on a computer system), while other errors may persist undetected and cause problems at a later point. In either case, errors can be difficult to diagnose and an exorbitant amount of computing resources may be used to identify an error and its underlying cause for resolution. In order to diagnose these errors, many computer systems and/or computing environments (e.g., operating systems or applications) may generate error messages associated with those errors and store those error messages in log files that are stored locally on the computer system.

However, with the increasing prevalence of distributed computing environments (e.g. an enterprise computer system or a cloud computer system), where tasks or execution threads associated with the same application may be performed across multiple components of the distributed computing architecture, the use of local log files makes it costly and difficult to effectively diagnose the errors. For instance, each component in a distributed computing architecture may have to create its own log files on a local machine. Since writing to log files is generally slow and consumes system resources, the processing of multiple log files would utilize a significant amount of resources across all of the components. This large collection of log files is difficult to maintain and parse through in order to identify specific problems, and it is even more difficult to diagnose those problems when multiple threads are writing error messages to the same log file. Furthermore, the large collection of log files introduces the challenge of performing any queries or analytics on the error messages contained in the log files. As a result, there exists a need for effective message logging and diagnostics for processes being performed across multiple components, especially in the context of distributed computing.

BRIEF SUMMARY

The present disclosure relates generally to providing effective diagnostics and logging of messages produced during the execution of processes across multiple components. More specifically, techniques (e.g., systems, methods, and computer-readable media) are disclosed for the management and processing of centralized log data for multiple processes, and for the analysis and effective diagnosing of errors that arise during execution of those processes.

In some embodiments, one or more components (e.g., of a distributed computing system) may execute one or more processes. Each of the processes may be implemented in different components, or the same components, of one or more computer systems. The computer systems may be implemented in an enterprise computing environment and/or a cloud computing environment. In at least one embodiment, a log management system is disclosed for managing and processing log data for multiple processes in order to perform analysis of errors that arise during execution of those processes. The component(s) may write messages (e.g., error messages) about or related to the processes executing in the component(s) to topics generated and managed by a log message system instead of writing messages to a local log file. Each topic serves as a centralized log file that can be remotely written to by each of the components, and each topic may be processed by the log management system, which may also be configured to read, identify, and organize the various messages in the topic.

Furthermore, the log management system may also be configured to apply enrichments and/or analytics to the messages (e.g., error messages) based on information from a knowledge source or the application of one or more machine learning models. The messages, enrichments, and analytics can be stored in an output topic that can be easily retrieved and viewed through a graphical interface. In other words, the log management system may organize and present the messages, enrichments, and analytics to a user of the log management system, in a manner that allows the user to more effectively diagnose any execution errors associated with the processes.

Some embodiments disclosed herein may be implemented by a computer system that is configured to implement the methods and operations disclosed herein. For example, a log management system may include a computer system. Yet some embodiments relate to systems, computer products, and machine-readable tangible storage media, which employ or store instructions for methods and operations disclosed herein. In at least one embodiment, systems may include one or more processors and memory. The memory may store instructions that are executable by the one or more processors to perform methods and operations disclosed herein. Systems may include a computer product, systems, portable consumer devices, machine-readable tangible storage media, modules, or a combination thereof, to perform methods and operations disclosed herein.

In some embodiments, a computer-implemented method is contemplated which involves a computer system of a log management system obtaining, from a message system, log data. The log data may include first log data generated based on an execution of a first process and second log data generated based on an execution of a second process. The log management system may identify a first exception message in the first log data, with the first exception message having a first exception type and corresponding to a first execution event occurring during the execution of the first process at a first time period. The log management system may identify a second exception message in the second log data, with the second exception message having a second exception type and corresponding to a second execution event occurring during the execution of the second process at a second time period, with the second time period occurring after the first time period.

In some embodiments, the log management system may determine whether the first execution event corresponding to the first exception message relates to an execution event that is critical to a normal flow of the execution of the first process. If the log management system determines that the first execution event corresponds to the first exception message relates to a critical execution event, then upon that determination the log management system may modify the log data to add an indicator to the first exception message, with the indicator identifying that the first execution event relates to the execution event that is critical.

The log management system may also determine that the first exception type is the same as the second exception type. Furthermore, the log management system may also determine that the second execution event occurred after the first execution event and the first execution event relates to the execution event that is critical. Upon making those determinations, the log management system may modify the log data to add an alert indicator to the second exception message, with the alert indicator identifying that the second execution event relates to a new kind of execution event.

In various embodiments, the log data may further include third log data generated based on an execution of a third process. The computer-implemented method may further involve identifying a third exception message in this third log data, and the third exception message may have a third execution type and correspond to a third execution event occurring during the execution of the third process at a third time period. The log management system may determine that the first exception type is the same as the third exception type. The log management system may also determine that the third execution event occurred after the second execution event and that the first execution event relates to the critical execution event, and upon that determination, the log management system may send instructions to a component (that executed the second process) to stop the execution of the second process.

In some embodiments, the component may be in the computer system. In some embodiments, the component may be in a second computer system.

In some embodiments, the computer-implemented method may further include determining that the third execution event occurred after the second execution event and determining that the first execution event relates to the critical execution event. Based on those two determinations, the log management system may send instructions to a component to stop the execution of the third process. In some embodiments, the computer-implemented method may further include executing a third process upon determining that the first execution event corresponding to the first exception message relates to the execution event that is critical.

In various embodiments, the first exception message has an exception context identifier. The log management system may identify in the log data a diagnostic message having the same execution context identifier and corresponding to the first process. Upon determining that the execution context identifier of the first exception message matches the execution context identifier of the diagnostic message, the log management system may modify the log data to group the diagnostic message with the first exception message.

In various embodiments, determining whether the first execution event relates to the execution event that is critical includes the log management system consulting a knowledge source identifying one or more execution events as critical. However, in other cases, determining whether the first execution event relates to the execution event that is critical includes the log management system applying, to the first execution event, a machine learning model configured to classify an execution event as critical or non-critical.

In various embodiments, the log management system may execute a third process based on determining that the second execution event occurred after the first execution event and based on determining that the first execution event relates to the execution event that is critical.

In various embodiments, the log management system may identify, in the log data, a set of exception types from a plurality of exception messages in the log data. The log management system may count the occurrences of each different exception type in the set of exception types and use that information to determine a subset of exception types with the highest count (e.g., the exception types that occur the most). The log management system may modify the log data to add a table indicating the subset of exception types with the highest count and the count for each exception type of the subset of exception types.

In various embodiments, the log management system may identify, in the log data, a set of components from a plurality of exception messages in the log data. The log management system may count the occurrences of each component in the set of components and use that information to modify the log data to add a table indicating the count for each component in the set of components.

In various embodiments, the log data may include third log data generated based on an execution of a third process. The log management system may identify, in the third log data, a third exception message having a third exception type and corresponding to a third execution event occurring during the execution of the third process at a third time period. The log management system, in determining whether the first execution event corresponding to the first exception message relates to the critical execution event, may consider the first exception message and first exception type and also the third exception message and the third exception type.

The foregoing, together with other features and embodiments will become more apparent upon referring to the following specification, claims, and accompanying drawings.

BRIEF DESCRIPTION OF THE DRAWINGS

Illustrative embodiments of the present disclosure are described in detail below with reference to the following drawing figures:

FIG. 5 illustrates a graphical user interface displaying log data by topic according to some embodiments of the present disclosure.

FIG. 6 illustrates a graphical user interface displaying a portion of an output topic according to some embodiments of the present disclosure.

FIG. 7 illustrates a graphical user interface displaying a portion of an output topic according to some embodiments of the present disclosure.

DETAILED DESCRIPTION

Figure 1:
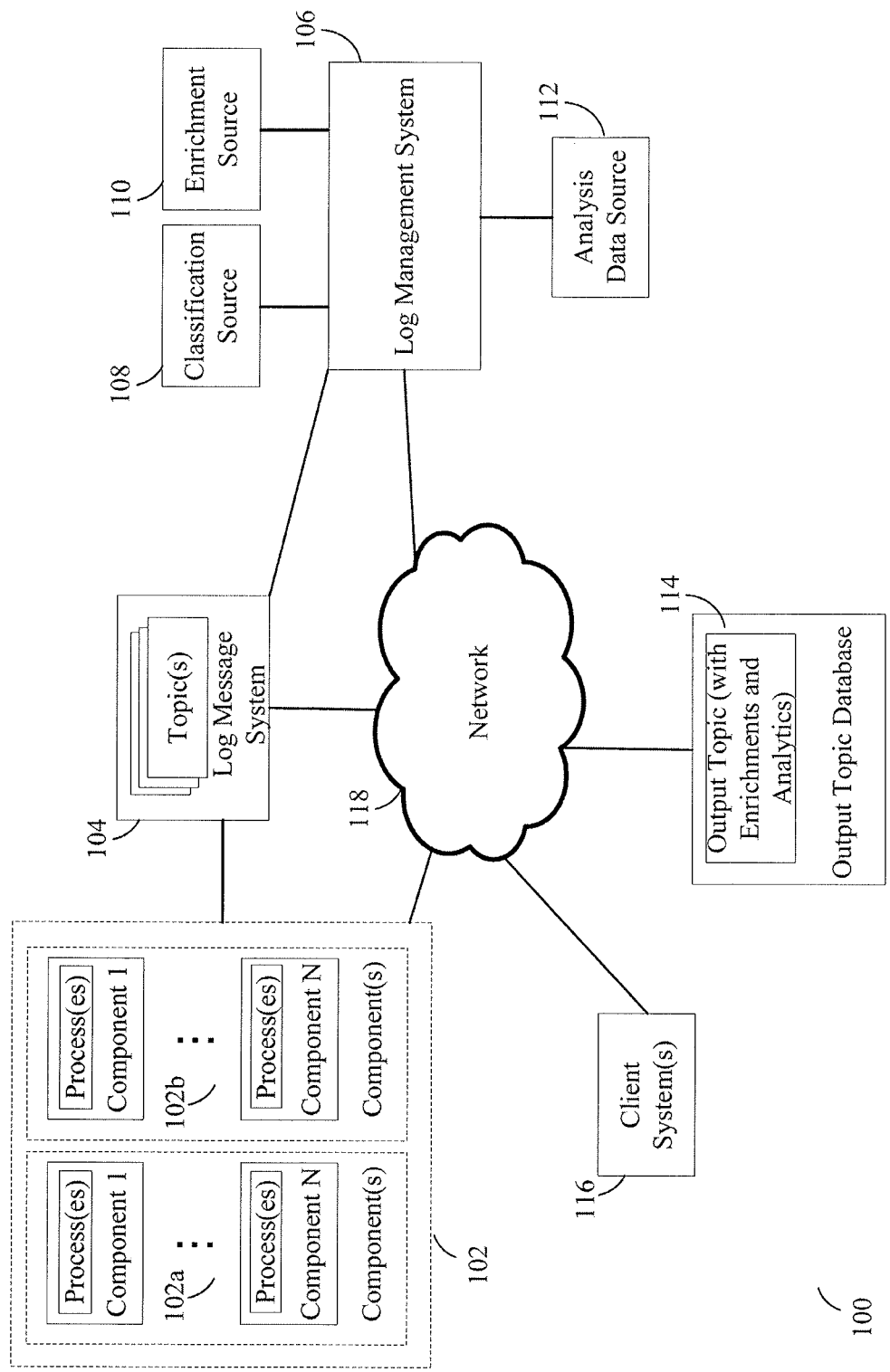
FIG. 1 illustrates a high-level block diagram of a system for managing and analyzing log data for messages according to some embodiments of the present disclosure.

In the following description, for the purposes of explanation, specific details are set forth in order to provide a thorough understanding of embodiments of the present disclosure. However, it will be apparent that various embodiments may be practiced without these specific details. For example, circuits, systems, algorithms, structures, techniques, networks, processes, and other components may be shown as components in block diagram form in order not to obscure the embodiments in unnecessary detail. The figures and description are not intended to be restrictive.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The present disclosure relates generally to providing effective diagnostics and logging of messages produced during the execution of processes across multiple components. More specifically, systems and methods are disclosed for the management and processing of centralized logs containing messages (e.g., error messages and diagnostic messages) such that the underlying problems associated with those error messages can be more effectively diagnosed.

In some embodiments, one or more components (e.g., of a distributed computing system) may execute one or more processes. These components may write messages to a topic of a log message system instead of writing messages to a local log file. In some embodiments, the messages being written may include log data, error messages, exception messages, and/or diagnostic messages. The log message system may be separate from the components, and in some embodiments, the log message system may include a database containing one or more topics. Accordingly, each topic serves as a centralized log file that can be remotely written to by each of the components. In other words, components are writing messages directly to a topic stored at a central location, rather than having components first write to local log files and then moving those log files (or their contents) to a central location. As a result, local log files are completely eliminated.

A diagnostic message may be a statement that is produced automatically during some computer processing activity, such as program runtime, that provides information on the status of the computer or its software, particularly errors or potential problems. Diagnostic messages can be used to collect information from hardware or software for analysis, troubleshooting and logging.

An exception may be an abnormal event occurring during the execution of a routine (that routine is the "recipient" of the exception) that results from the failure of an operation called by the routine. In some cases, an exception may be an execution event that is critical and interrupts, alters, or breaks the normal flow of execution. Some exceptions may be caught and handled (e.g., to allow execution to resume), while other exceptions may be uncaught. In some instances, an exception message may be produced as a result of an exception and the exception message may provide details that can be helpful in fixing the problem. In some instances, the exception message may include debug information such as a string representation of the exception and the stack trace.

In some embodiments, each error message written to the topic may also be associated with, and include, an execution context identifier (ECID). The ECID may be an identifier used to correlate events associated with the same transaction or request (e.g., events that are part of the same request execution flow) across several components. In other words, events that are identified as being related to a particular service request will typically have the same ECID value. Thus, each request may be associated with an unique ECID, even if that request is going to another machine. When error messages are logged in the central topic, they may be scattered all over the topic due to multiple requests occurring at the same time. The ECID may serve as way for error messages within the topic to be organized and grouped with other error messages for the same request.

In some embodiments, a log management system may retrieve topics from the log message system for processing. The log management system may be configured to read, identify (e.g., between diagnostic messages and exception messages), and organize the various error messages in the central topic. This log management system may also apply enrichments and/or analytics to the error messages to make it easier to diagnose execution errors from the error messages. In some cases, the added enrichments or analytics may provide a reader of the topic the ability to develop insights at a glance of the topic. The log management system may generate an output topic containing the error messages (in some cases, the error messages may be organized), enrichments, and analytics.

The output topic may be written to a file and/or stored in a database and easily retrieved on request. For example, a user or administrator of one or more client systems may wish to review the output topic to diagnose execution errors (e.g., associated with requests, processes, and/or the components executing the processes). The log management system may retrieve the desired output topic and provide it for display through a graphical interface presented on the client system. This output topic may even be reviewed remotely, allowing the user to view it anytime and anywhere. Furthermore, the organized error messages, enrichments, and analytics of the output topic may allow the user to more effectively diagnose execution errors.

These features may provide numerous benefits towards the effective diagnosis of execution errors. For example, the components all write error messages to a central topic. This is an advantage over having components writing to their own local log files, which would create a high number of log files and make it difficult to troubleshoot since a process may be executed on multiple components (and thus, errors messages associated with that process would be in multiple log files). Furthermore, these features make error messages, such as diagnostic messages and/or exception messages, easier to show in a graphical interface since there is no need to parse a collection of log files which may contain error messages irrelevant to diagnosing the execution error at hand. Instead, an output topic is generated that contains organized error messages (e.g., grouped by ECID) rather than a jumbled mess of error messages. This allows error messages from the same requests to be easily viewed together.

FIG. 1 illustrates a high-level block diagram of a system 100 for managing and analyzing log data for messages according to some embodiments of the present disclosure. Embodiments depicted in FIG. 1 are merely examples and is not intended to unduly limit the claimed embodiments of the present disclosure. One of ordinary skill in the art would recognize many variations, alternatives, and modifications.

In some embodiments, the computing system 100 may include a collection of distributed computing systems 102, which may include one or more distributed computing systems. In the figure, the collection of distributed computing systems 102 is shown to include a first distributed computing system 102a and a second distributed computing system 102b, but there may be any number of component systems. Each of the first distributed computing system 102a and the second distributed computing system 102b has a set of components, such as components 102-1 through 102-N. In some embodiments, the one or more components (e.g., of a distributed computing system) may execute one or more processes. Each of the processes may be implemented in different components or the same components of one or more distributed computer systems. In some cases, each of the components may refer to a physical and/or virtual node of a distribute computer system. For example, a component may refer to a general purpose computer or a specialized server computer (e.g., a PC server, UNIX server, mid-range server, mainframe computer, rack-mounted server, etc.). Or a component may refer to a virtual machine (e.g., a VM node) running across a distributed set of computers. In some cases, a component may refer to program code (e.g., an application running on a physical and/or virtual node), such as an operating system, or a server application such as an HTTP server application, FTP server application, CGI server application, Java server application, database server application, and the like. Thus, the set of components in each distributed computing system may include a combination of hardware and/or software.

Each distributed computing system may be implemented in an enterprise computing environment and/or a cloud computing environment. In at least one embodiment, a log management system 106 is disclosed for managing and processing log data for multiple processes to perform analysis of errors that arise during execution of those processes. The components may write messages (e.g., error messages) about or related to the processes executing in the component(s) to topics generated and managed by a log message system 104 instead of writing messages to a local log file. Each topic serves as a centralized log file that can be remotely written to by each of the components, and each topic may be processed by the log management system, which may also be configured to read, identify, and organize the various error messages in the topic.

Accordingly, the computing system 100 may also include a log message system 104, a log management system 106, an output topic data store 114, and one or more client systems(s) (collectively, client systems 116). The collection of distributed computing systems 102, the log message system 104, the log management system 106, the output topic data store 114, and the client systems 116 may each be communicative coupled to the network 118 (e.g., the Internet). In some embodiments, the log message system 104 may also be directly in communication with the log management system 106. Various aspects of the computing system 100 may be part of an enterprise system implemented for an enterprise.

In some embodiments, each of the components of the collection of distributed computing systems 102 may be configured to execute or perform one or more processes. In some embodiments, the processes may belong to one or more applications. In some embodiments, the components 102 may receive service requests (e.g., from one or more users, customers, and so forth). These service requests may be associated with one or more applications, which may be disparate from each other. The components of the collection of distributed computing systems 102 may be configured to execute processes in response to, or associated with, the received service requests (e.g., to fulfill the service requests). These processes may be associated with a single application. However, since the service requests may be associated with multiple, disparate applications, the processes may also be associated with multiple, disparate applications.

Each of the components of the collection of distributed computing systems 102 may be configured to write log data and messages (e.g., error messages associated with errors encountered) that arise in the execution of those processes to a topics(s).

In some embodiments, the log message system 104 may be capable of simultaneous input and/or output. For example, the log message system 104 may receive simultaneous inputs from the components of the collection of distributed computing systems 102.

The log message system 104 may be configured to manage a collection of topics. In some embodiments, each topic may correspond to error messages associated with a single application across the components of the collection of distributed computing systems 102. In some embodiments, each topic may correspond to error messages associated with multiple applications across the components of the collection of distributed computing systems 102. In some embodiments, each topic may correspond to a single type of process being executed by the components of the collection of distributed computing systems 102. In some embodiments, each topic may correspond to multiple types of processes being executed by the components of the collection of distributed computing systems 102. In some embodiments, the error messages in the topics may be grouped using time intervals, such as by having each topic correspond to a different day. In that instance, all the error messages received by the log message system 104 for a particular day would be grouped into a single topic. In some embodiments, the error messages in the topics may be grouped by the source of the service requests. For example, a topic may correspond to a specific user of the components, such that all the error messages associated with that user's service requests are in the same topic.

In some embodiments, techniques (e.g., systems, methods, and machine-readable media), are disclosed for managing the collection of topics using a storage device as a security device (e.g., the log message system 104 may store the collection of topics in the storage device). Storage devices can be portable or may be remotely accessible.

A storage device can be any type of persistent storage device capable of storing electronic data. Storage devices may include a non-transitory memory device, including volatile and non-volatile memory devices. Examples of memory devices may include system memory, such as a number of memories including a volatile main random access memory (RAM) for storage of instructions and data during program execution and a non-volatile read only memory (ROM) or flash memory in which fixed instructions are stored. System memory may include multiple different types of memory, such as static random access memory (SRAM) or dynamic random access memory (DRAM). Storage devices may include non-transitory computer-readable storage media. For example, computer-readable storage media may include volatile or non-volatile, removable or non-removable media implemented in any method or technology for storage of information such as computer-readable instructions, data structures, program modules, or other electronic data. By way of example, computer-readable storage media may include non-volatile memory such as a hard disk drive, a magnetic disk drive, an optical disk drive such as a CD ROM, DVD, a Blu-Ray® disk, or other optical media. Computer-readable storage media may include, but is not limited to, Zip® drives, flash memory cards, universal serial bus (USB) flash drives, secure digital (SD) cards, DVD disks, digital video tape, and the like. In FIG. 1, the collection of topics can be stored on a data storage device that can be a flash memory drive that is portable for use and accessibility at different computer systems. Computer-readable storage media may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAIVI) SSDs, and hybrid SSDs that use a combination of DRAM and flash memory based SSDs. Computer-readable media may provide storage of computer-readable instructions, data structures, program modules, and other data for computing system 100. In some embodiments, a storage device can be implemented as one or more flexible pools of logical storage that are virtualized to maintain virtual storage devices on a computer system (e.g., a server). Storage devices may be implemented as network-attached or network-accessible storage devices. Such storage devices may be accessible via a storage-area network (SAN).

In some embodiments, the log management system 106 may be implemented by a computing system. The computing system may include one or more computers and/or servers (e.g., one or more access manager servers), which may be general purpose computers, specialized server computers (including, by way of example, PC servers, UNIX servers, mid-range servers, mainframe computers, rack-mounted servers, etc.), server farms, server clusters, distributed servers, or any other appropriate arrangement and/or combination thereof. The log management system 106 may run any of operating systems or a variety of additional server applications and/or mid-tier applications, including HTTP servers, FTP servers, CGI servers, Java servers, database servers, and the like. Exemplary database servers include without limitation those commercially available from Oracle, Microsoft, and the like. The log management system 106 may be implemented using hardware, firmware, software, or combinations thereof.

In some embodiments, the log management system 106 may be implemented by multiple computing devices deployed as a cluster in a data center, which allows for scalability and high availability. Multiple such geographically dispersed data centers with access manager server clusters can be connected (wired or wirelessly) to constitute a multi-data center (MDC) system. An MDC system may satisfy high availability, load distribution, and disaster recovery requirements of access servers within an enterprise computer network.

The log management system 106 may include at least one memory, one or more processing units (or processor(s)), and storage. The processing unit(s) may be implemented as appropriate in hardware, computer-executable instructions, firmware, or combinations thereof. In some embodiments, the log management system 106 may include several subsystems and/or modules. Each of these subsystems and/or modules in the log management system 106 may be implemented in hardware, software (e.g., program code, instructions executable by a processor) executing on hardware, or combinations thereof. In some embodiments, the software may be stored in a memory (e.g., a non-transitory computer-readable medium), on a memory device, or some other physical memory and may be executed by one or more processing units (e.g., one or more processors, one or more processor cores, one or more GPUs, etc.). Computer-executable instructions or firmware implementations of the processing unit(s) may include computer-executable or machine-executable instructions written in any suitable programming language to perform the various operations, functions, methods, and/or processes described herein. The memory may store program instructions that are loadable and executable on the processing unit(s), as well as data generated during the execution of these programs. The memory may be volatile (such as random access memory (RAM)) and/or non-volatile (such as read-only memory (ROM), flash memory, etc.). The memory may be implemented using any type of persistent storage device, such as computer-readable storage media. In some embodiments, computer-readable storage media may be configured to protect a computer from an electronic communication containing malicious code. The computer-readable storage media may include instructions stored thereon, that when executed on a processor, perform the operations described herein.

The log message system 104 may communicate with log management system 106 via one or more communication networks. Log management system 106 may communicate with log message system 104 via one or more communication networks 118. Examples of communication networks may include a mobile network, a wireless network, a cellular network, a local area network (LAN), a wide area network (WAN), other wireless communication networks, or combinations thereof. In some embodiments, the log management system 106 may be able to request and receive log data based on topic (e.g., a topic) from the log message system 104. In some cases, the log management system 106 may receive topics through the network 118, while in other cases, the log management system 106 may be able to directly retrieve the topics from the log message system 104.

As components (e.g in the collection of distributed computing systems 102) executed processes, they may generate messages (including log data, error messages, and/or diagnostic messages) associated with the execution of those processes. For example, if a component experiences an execution event in the course of execution of the process that alters or breaks the normal flow of execution of that process, the component may generate a message associated with that event. These messages may be written to topics of the log message system 104, which will store and manage all of the different topics (e.g., written to by all of the different components).

Thus, all of the components may submit their generated messages associated with the execution of processes to the log message system 104. Accordingly, each topic serves as a centralized log file that can be remotely written to by each of the components. In other words, components are writing messages directly to a topic stored at a central location rather than having the components first write to local log files and then moving those log files (or their contents) to a central location. As a result, local log files are completely eliminated.

There are numerous advantages to eliminating log files in this manner. For example, local log files would take up a large amount of local resources associated with each component, leaving less resources available to the collection of distributed computing systems 102. In particular, the local log files would take up a lot of localized storage space (e.g., hard drive space) across the various computers of the distributed computing systems 102. Furthermore, any manipulation of those log files after they have already been generated will take up additional memory and processing resources from the computers of the distributed computing systems 102. Thus, implementing the log message system 104 to manage topics can improve the performance and efficiency of the components and the distributed computing systems 102 by offloading the management and processing of the topics. Furthermore, a large amount of local log files stored in different locations is very difficult to search and organize. This makes it difficult for pinpointing the cause of the messages being generated. For instance, if multiple components are experiencing a similar error when executing a process, those components may all generate similar error messages. It may be easier to determine what is the cause of the error if all those components and their similar error messages can be taken into account. However, this can be inefficiency and difficult to do if all those error messages are stored in local log files. Having all the messages organized and managed by the log message system 104 allows for faster and more efficient diagnosing of the underlying problems.

Furthermore, having all the messages organized and managed by the log message system 104 allows relationships between different events and similar events to be identified, and those relationships can indicate a larger issue among one or more components or multiple instances. In particular, patterns of events that happen after multiple occurrences of an error can be easily identified. The reduction in time needed to identify these patterns will lead to correcting the issue and preventing propagation of the error within the components.

Additionally, the organization aspect also allows those messages from different components to be enriched and quickly presented to the user for diagnostic purposes, which serves as a vast improvement over having the user sift through individual log files in the hopes of picking up on any patterns in the messages that may lead to an effective diagnosis.

The client system 116 may access topics or output topics via the log management system 106. The client system may request it from the log management system 106, which may retrieve that output topic from the output topic data store 114 and send it to the client system. In some embodiments, the client system 116 may include an application that is a topic management application that may present interfaces, such as graphical user interfaces (GUIs), some of which are disclosed herein. The application may be provided as part of a service (e.g., a cloud service) or a network-based application. Applications may enable a user to access topics provided by the log management system 106. The log management system 106 may be configured to run one or more services or software applications described in the foregoing disclosure. For example, log management system 106 may provide management of access (e.g., granting/denying access) to topics, and the log management system 106 may provide the client system 116 features such as automatic sign-on, application password change and reset, session management, application credential provisioning, as well as authentication of a session. In some embodiments, log management system 106 can provide access to log topics through various applications, such as Windows® applications, Web application, Java® applications, and mainframe/terminal-based applications running or being accessed from client devices. As explained above, the log management system 106 may perform authentication of a user operating a client device (e.g., client system 116). Authentication is a process by which a user verified to determine that he/she is who he/she claims to be.

The log management system 106 may also provide services or software applications over non-virtual and virtual environments. In some embodiments, these services may be offered as web-based or cloud services or under Software as a Service (SaaS) model to the users of clients. The services offered by log management system 106 may include application services. Application services may be provided by log management system 140 via a SaaS platform. The SaaS platform may be configured to provide services that fall under the SaaS category. The SaaS platform may manage and control the underlying software and infrastructure for providing the SaaS services. By utilizing the services provided by the SaaS platform, users can utilize applications executing in log management system 106, which may be implemented as a cloud infrastructure system. Various different SaaS services may be provided. Users operating clients (e.g., client system 116) may in turn utilize one or more applications to interact with the log management system 106 to utilize the services provided by subsystems and/or modules of the log management system 106.

The log management system 1406 may also include or be coupled to additional storage, which may be implemented using any type of persistent storage device, such as a memory storage device or other non-transitory computer-readable storage medium. In some embodiments, local storage may include or implement one or more databases (e.g., a document database, a relational database, or other type of database), one or more file stores, one or more file systems, or combinations thereof. For example, log management system 106 is coupled to or includes one or more data stores for storing data such as the topics containing log data from the various executed processes. The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data.

In some embodiments, the log management system 106 may be configured to apply enrichments and/or analytics to topics retrieved from the log message system 104. In some embodiments, the log management system 106 may be communicatively coupled to a classification source 108, an enrichment source 110, and an analysis data source 112. These sources may provide data used by the log management system 106 to apply the enrichments and/or analytics to topics, which results in the generation of output topics.

In some embodiments, the log management system 106 may produce log data that is managed based on topics that have the applied enrichments and analytics. These output topics may be sent to the output topic data store 114 (e.g., a database or written to a centralized log file), where they can be stored and retrieved for further review, such as when one of the client systems 116 may seek to retrieve a specific output topic in order to diagnose the error messages contained within. The client system may request it from the log management system 106, which may retrieve that output topic from the output topic data store 114 and send it to the client system.

Figure 2:
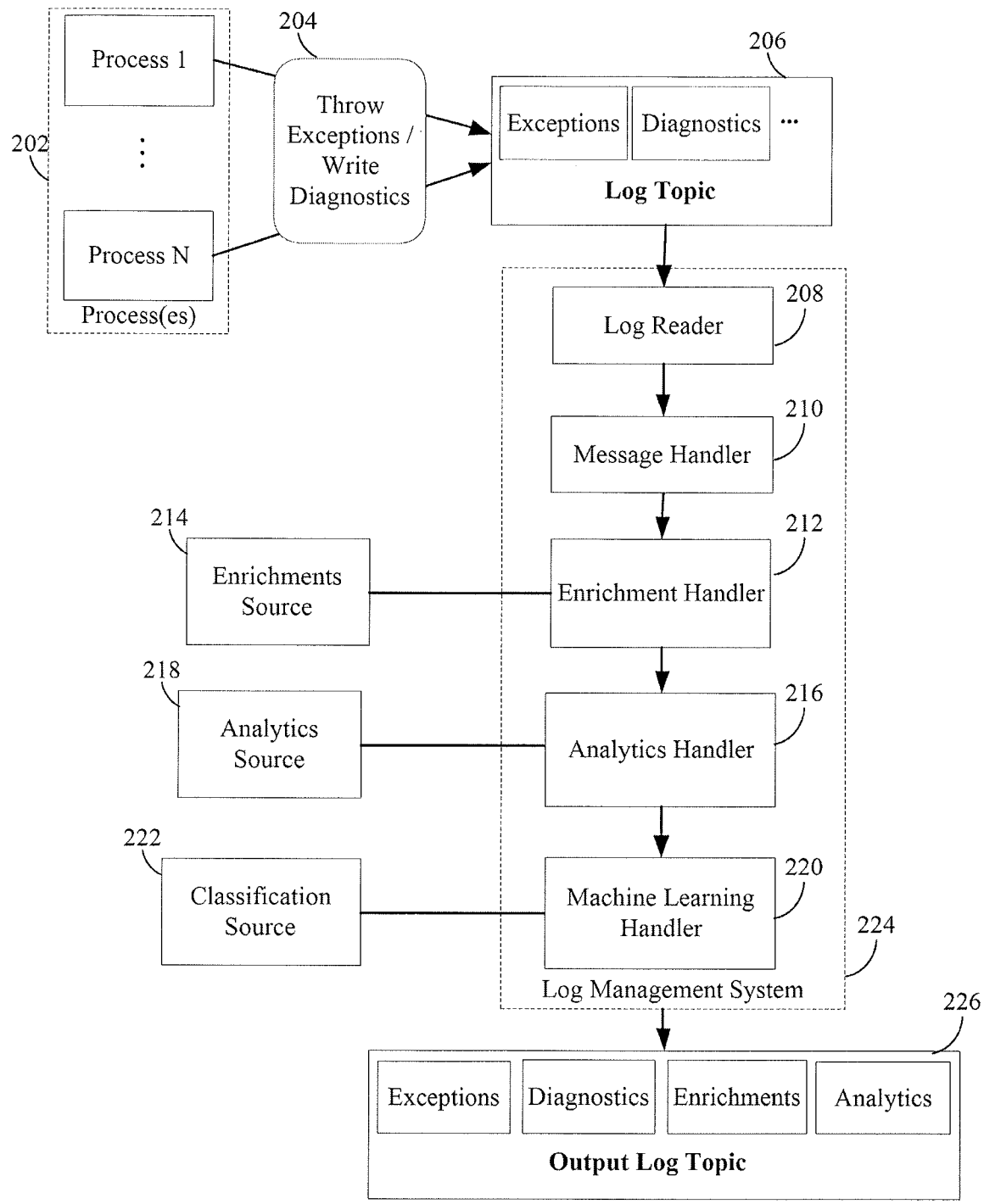
FIG. 2 illustrates a detailed block diagram illustrating analyzing log data based on topics according to some embodiments of the present disclosure.

FIG. 2 illustrates a detailed block diagram illustrating analyzing log data based on topics according to some embodiments of the present disclosure.

In some embodiments, there may be one or more processes, such as processes 202-1 through 202-N (collectively, processes 202), which are executed by the components (e.g., the components of the collection of distributed computing systems 102 of FIG. 1) of a distributed computing system in order to fulfill service requests.

At block 204, during execution, each of the processes 202 may generate various messages. For example, each of the processes 202 may throw exceptions and generate exception messages, or they may generate diagnostic messages. Those processes 202 may write any generated error messages to the same topic 206, which may be handled by the log message system (e.g., the log message system 104 of FIG. 1).

In some embodiments, the topic 206 may be retrieved by the log management system 224 in order to apply enrichments and/or analytics to the messages contained in the topic 206. The log management system 224 may be similar to the log management system 106 shown in FIG. 1. In some embodiments, messages may be obtained from the topics (as opposed to local files) via a programming interface through the use of functions and API calls. The interface may be used to obtain messages with respect to a specific process, a specific component, or some other grouping. In some embodiments, messages may be obtained from the topics via a streaming platform that allows publishing and subscribing to a stream of records. One example of a streaming platform may be Kafka, which acts as a message queue (e.g., like an enterprise message system) for the topic 206.

In some embodiments, the log management system 224 may include a log reader 208 configured to handle communication with a log message system (e.g., the log message system 104 of FIG. 1) for creating, retrieving, reading, updating, and/or deleting the topic 206. The log reader 208 may be configured to read topics of many different formats (e.g., if there are multiple log message systems that utilize different formats for storing topics). The log reader 208 may also normalize or convert topics of various formats to a singular format used by the log management system 224. In some embodiments, the log reader 208 may also read and parse the messages contained within the topic 206. In some embodiments, the messages within the topic 206 may be obtained and/or grouped by the log reader 208.

After the messages from the topic 206 have been obtained, the message handler 210 of the log management system 224 may identify or classify each error message. In some embodiments, the message handler 210 may determine whether each message is an error message, exception message, diagnostic message, and so forth. Accordingly, the message handler 210 may be configured to obtain and identify error messages from the topic 206. The message handler 210 may also be configured to generate new error messages or modify existing error messages (e.g., to apply certain formatting to the error messages or to insert certain enrichments/analytics into the error messages).

After the individual error messages have been identified from the topic 206, the message handler 210 may provide those error messages to the enrichment handler 212. The enrichment handler 212 may be configured to apply enrichments to the error messages. In some embodiments, the enrichments can include troubleshooting tips. For example, the log management system 224 may be aware of particular types of exceptions and the types of exception messages associated with those exceptions. For instance, one type of exception may be due to misconfigurations (e.g., a keystore is not configured, a key is not created, the keystore password is wrong, and so forth), and these exceptions may generate specific kinds of exception messages. There may be known solutions or troubleshooting tips for resolving that type of exception and/or an exception corresponding to one of the exception messages. All of this information may be known to the log management system 224, such that the log management system 224 can determine whether solutions or troubleshooting tips exist for any of the exception messages. This information may be managed in a repository accessible to the log management system 224, or it may be obtained from a third party source. That information is an example of an enrichment that can be added to the error messages or the contents of the topic by the enrichment handler 212. In some embodiments, analytics may be performed based on previous messages and enrichments may be determined based on the analytics or based on identifying information in the message that suggests an attribute which can be used to determine the enrichment.

In some embodiments, the data associated with the enrichments may come from a repository or storage device. In some embodiments, the data associated with the enrichments may come from an external feed, such as the enrichments source 214. For instance, the enrichments source 214 may be a database that contains known solutions or troubleshooting tips corresponding to certain types of exceptions or specific exception messages. Accordingly, the enrichment handler 212 may reference the enrichments source 214 in order to determine which exception messages to apply enrichments to. In these examples, the enrichment handler 212 is discussed in the context of applying enrichments to exception messages. However, enrichments can similarly be applied to diagnostics messages. In other words, the enrichments source 214 could contain solutions or troubleshooting tips associated with particular diagnostics messages and the enrichment handler 212 may be configured to apply those enrichments to diagnostics messages as well. In some embodiments, the enrichments may be solutions or troubleshooting tips associated with specific exception messages or diagnostics messages. The database of enrichments may contains all of the different known messages (which, in some cases, can be indexed by an identifier). Thus, the enrichment handler 212 may take each message in a topic and look up each message against the messages in the database of enrichments. For example, each message may be looked up against known or previously-seen messages stored in the database. In some embodiments, groups and/or combinations of messages in the topic may also be looked up against groups of known or previously-seen messages. Once a message in a topic has been identified against a known message in the database of enrichments, the database of enrichments may have information, such as diagnostic information, solutions, or troubleshooting tips, associated with that known message that can be retrieved and then directly inserted into the topic for viewing by a user.

After enrichments are applied to the error messages, the analytics handler 216 may be configured to analyze the messages and log data in order to determine analytical information (e.g., analytics) and apply those analytics to the error messages. In some embodiments, the analytics may include queries. For instance, the analytics handler 216 may query the error messages in order to determine counts, such as the number of each type of exception message or the number of error messages associated with each component. In some embodiments, the counts may be based on consideration of different types of error messages and/or exception messages. For instance, messages of a first type, a second type, and a third type may all be considered critical (e.g., related to an execution event that is critical) and any occurrences of messages in one of those types may be tallied up in order to provide a count of the total amount of messages that are critical. In some embodiments, the counts may be based off of groups or combinations of different types of messages. For example, the same message or several different messages detected in a sequence over a time period from different components may be factored into the count. In some embodiments, the analytics source 218 may provide rules or instructions to the analytics handler 216 for how to perform such queries. In some embodiments, those rules or instructions may be encapsulated in a policy which may be defined by a user or based on previous analytics.

In some embodiments, the data associated with the analytics may come from an external feed, such as the analytics source 218. For instance, in some embodiments, alerts may be determined from the analytics. Alerts (e.g., a "new" alert) may be raised when a new kind of exception is raised, assuming that known exceptions may already have a fix or solution available. Known exceptions may be catalogued in the analytics source 218, which can be a database used by the analytics source 218 to determine if each exception message corresponds with a known fix or solution. When a new kind of exception is detected, the analytics handler 216 may add the alert to the error messages or to the contents of the topic. In some embodiments, when a new kind of exception is detected, the log management system 224 may file a bug report or may instruct the component associated with the exception to kill the process that caused the exception if that process is still running.

In some embodiments, the analytics may include classifications or clustering of error messages that can be performed through machine learning. These analytics may be added or inserted into the error messages, or they can be added to the contents of the topic (e.g., the analytics can inserted between error messages or they can be added to the header). For example, the analytics handler 216 may utilize the analytics source 218 to determine how serious each error message may be (e.g., by classifying serious error messages and their corresponding execution error as "critical" rather than "non-critical"). For execution errors which are determined to be critical, a critical indicator may be added to that error message. This determination can involve varying factors. In some instances, execution errors may be determined to be critical based on past patterns, such as which execution errors historically have been critical. Similarly, the determination could involve comparing the error message itself against similar error messages known to be associated with critical execution errors (e.g., if the error message is an exception message, that message may be related to other exception messages based on an exception type). In some cases, the determination may factor in the frequency that an error message appears in the topic. For instance, the more frequently that one kind of exception message arises in the topic, the more likely that kind of exception message is associated with critical execution errors.

In some cases, which error messages in a topic are determined to be critical may impact the analytics of other error messages. For instance, an exception message having a certain exception type may have been considered critical. As a result, any other exception messages of that exception type may trigger an alert because there is a possibility those other exception messages are related to the critical execution error. Accordingly, the analytics handler 216 could identify the exception types associated with the exception messages in the topic and insert an alert for any exception messages that have the same exception type.

After the analytics are applied to the error messages, the machine learning handler 220 may update any machine learning models using the error messages contained in the topic, as well as using any enrichments or analytics that were applied to the error messages. For example, the machine learning handler 220 may store information relevant to the machine learning model in the classification source 222. This allows the machine learning models to be constantly, or periodically, updated as new topics are retrieved and processed by the log management system 224. Some examples of machine learning models in this instance may include machine learning models for classifying new error messages or exception messages that appear (and have not been seen before). For instance, some new error messages can be classified as critical (e.g., requiring the user's immediate attention and review) or non-critical. Examples of variables considered in the classification may include the frequency of the error messages, the chronological relation of that error message to other error messages (e.g., the new error message always comes after another type of error message), the similarity to other types of error messages (e.g., the new error message may have a lot in common with another type of error message that is critical), and so forth.

After the topic 206 has been processed by the log management system 224 and enrichments and/or analytics have been applied, the log management system 224 may generate or print an output topic 226 that contains the error messages (e.g., exception messages and/or the diagnostics messages) from the topic 206 as well as the applied enrichments and analytics. The output topic 226 may be viewable through a graphical interface and can be retrieved for viewing when requested by a user or administrator (e.g., the client systems 116 in FIG. 1). In some embodiments, the output topic 226 may be spooled to some other permanent storage to be read or displayed from there.

In some embodiments, the topic 206 may be used to feed an instruction back to one of the components (e.g., of the collection of distributed computing systems 102) in order to alter the execution of a process. For example, the log data in the topic 206 may be analyzed by the log management system 224 in order to determine relationships between messages in the log data associated with different execution events. These relationships can be used to control components or send instructions to the components. For example, the log management system 224 could send instructions to halt execution of the particular processes that caused the execution events associated with certain messages in the log data.

For instance, the log management system 224 may identify a first exception message and a second exception message in the log data, with the first exception message having a first exception type and corresponding to a first execution event occurring during the execution of the first process at a first time period, and the second exception message having a second exception type and corresponding to a second execution event occurring during the execution of the second process at a second time period, and with the second time period occurring after the first time period. The log management system 224 may also identify a third exception message, with the third exception message having a third execution type and corresponding to a third execution event occurring during the execution of the third process at a third time period. The log management system 224 may determine that the first exception type is the same as the third exception type. The log management system 224 may also determine that the third execution event occurred after the second execution event and that the first execution event relates to an critical execution event (e.g., an execution event that alters or interrupts the normal flow of execution of a process), and upon that determination, the log management system 224 may send instructions to a component (that executed the second process) to stop the execution of the second process. Or, alternatively, the log management system 224 may determine that the third execution event occurred after the second execution event and that the first execution event relates to a critical execution event. Based on those two determinations, the log management system 224 may send instructions to a component to stop the execution of the third process. Or, as another alternative example, the log management system 224 may send instructions to a component to execute a third process upon determining that the first execution event corresponding to the first exception message relates to a critical execution event.

In some embodiments, the output topic 226 may be organized differently than the topic 206. There may be more or less information in the output topic 226 compared to the topic 206. Some error messages from the topic 206 may be modified, with certain enrichments or analytics being directly added to the error messages. Other enrichments or analytics may be stored in the header or the metadata of the output topic 226.

In some embodiments, the output topic 226 may log diagnostics messages and exception messages separately, which allows the graphical interface to show strictly diagnostics messages or strictly exception messages.

Figure 3:
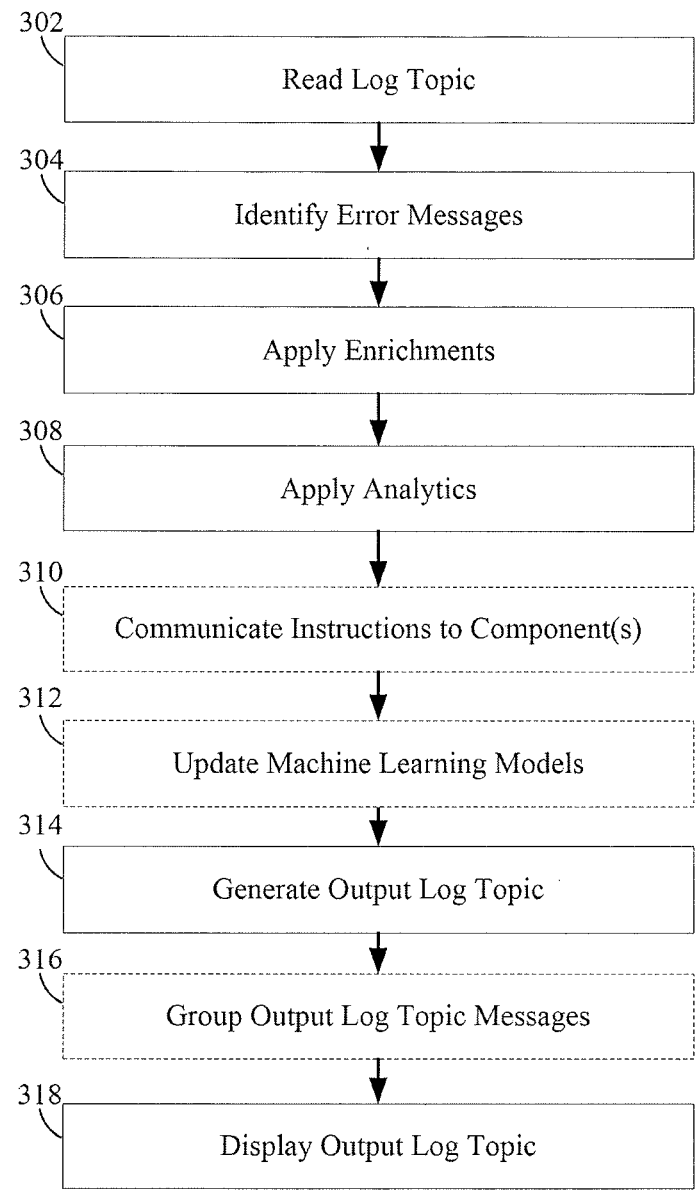
FIG. 3 illustrates a sequence diagram of processes for managing and analyzing log data by topic according to some embodiments of the present disclosure.

FIG. 3 illustrates a a sequence diagram of processes for managing and analyzing log data by topic according to some embodiments of the present disclosure. The processes may be implemented by log management system 106 of FIG. 1.

At block 302, the log management system may read a topic retrieved from the log message system. In some embodiments, this is handled by a log reader of the log management system. This topic may contain various types of error messages, and in some cases the topic may be unorganized or in plain text format.

At block 304, the log management system may identify each error message in the topic. In some embodiments, this is handled by a message handler of the log management system. In some embodiments, the error messages identified in the topic are logged separately (e.g., the exception messages are distinguished from the diagnostics messages).

At block 306, the log management system may apply enrichments to the error messages. In some embodiments, this is handled by an enrichment handler of the log management system. The enrichments may be added or inserted into the error messages, or they can be added to the contents of the topic (e.g., the enrichments can inserted between error messages or they can be added to the header).

At block 308, the log management system may apply analytics based on queries to the error messages. In some embodiments, this is handled by an analytics handler of the log management system. The analytics handler may query the error messages in order to obtain counts or statistics associated with the error messages, such as the frequency of certain types of error messages or which components the majority of error messages correspond to. These analytics may be added to the contents of the topic (e.g., they can be added to the header). The log management system may also apply analytics to the error messages based on machine learning models. In some embodiments, this is also handled by the analytics handler of the log management system. The analytics handler may consult an analytics source in order to classify error messages using machine learning models, such as to determine how serious each error message may be (e.g., by classifying serious error messages as "critical"). These analytics may be added or inserted into the error messages, or they can be added to the contents of the topic (e.g., the analytics can inserted between error messages or they can be added to the header).

At block 310, the log management system may optionally communicate instructions to components that executed processes associated with some of the error messages. For instance, the log management system may determine some error messages to be critical (e.g., by applying analytics) and further determine the components associated with those critical error messages. The log management system can instruct those components to stop the processes that generated those critical error messages.

At block 312, the log management system may optionally update any machine learning models (e.g., used to perform analytics). For example, the error messages, enrichments, and analytics may be stored and utilized for additional training data for the machine learning models to improve their accuracy. This allows the machine learning models to be constantly or periodically updated as new topics are retrieved and processed by the log management system.

At block 314, the log management system may generate an output topic that contains the error messages, enrichments, and analytics. This output topic may be stored and later retrieved to be provided to one or more client systems for display through a graphical interface.

At block 316, the error messages in the output topic may optionally be grouped in some manner prior to their display through the graphical interface. For example, there may be an option to only display the diagnostics messages (and their associated enrichments or analytics) within the output topic, or there may be an option to only display the exception messages (and their associated enrichments or analytics) within the output topic. In some embodiments, there may be an option to group error messages in the output topic by their execution context identifier (ECID). Thus, error messages associated with the same request will be grouped together when displayed through the graphical interface.

At block 318, the contents of the output topic may be displayed through the graphical interface (e.g., presented on one or more client systems) for diagnostic purposes. Alternatively, the contents of the output topic may be sent out to various kinds of storages, such as databases, file systems (e.g., log files), and so forth, where they can be later read and displayed.

Figure 4:
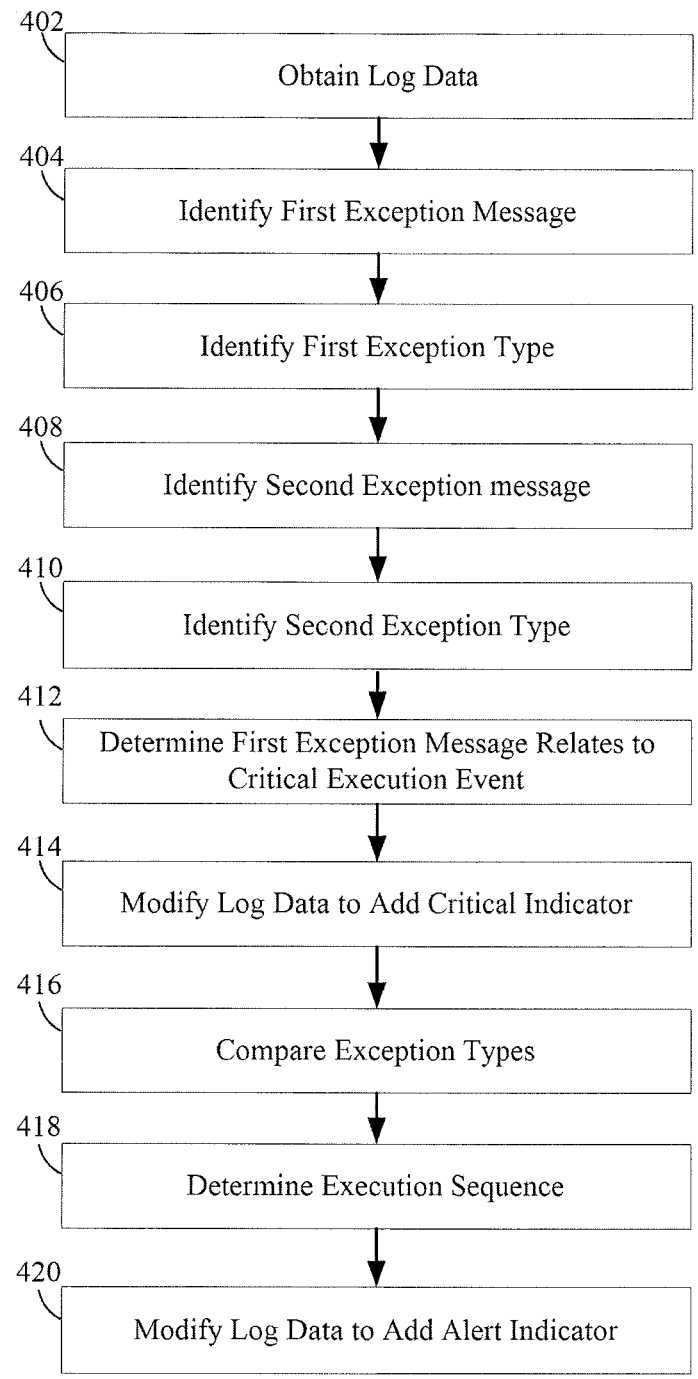
FIG. 4 illustrates a sequence diagram of processes for processing log data by topic according to some embodiments of the present disclosure.

FIG. 4 illustrates a sequence diagram of processes for processing log data by topic according to some embodiments of the present disclosure.

At block 402, a computer system of a log management system may obtain log data from a log message system. This log data may include first log data and second log data. The first log data may be generated based on the execution of a first process, while the second log data may be generated based on the execution of a second process. The first and second process may be executed on the same component (e.g., computing device), or they may be executed on different components.

At block 404, the computer system of the log management system may identify, in the first log data, a first exception message having a first exception type and corresponding to a first execution event occurring during the execution of the first process at a first time period. At block 406, the computer system may identify the first exception type associated with the first exception message.

At block 408, the computer system may identify, in the second log data, a second exception message having a second exception type and corresponding to a second execution event occurring during the execution of the second process at a second time period, with the second time period occurring after the first time period. At block 410, the computer system may identify the second exception type associated with the second exception message.

At block 412, the computer system may determine whether the first execution event corresponding to the first exception message relates to a critical execution event. This may be performed through various ways, such as by looking up that exception message and/or its exception type in a reference or database that indicates whether that exception message arises from a critical execution event. In some cases, there may be a machine learning model that is configured to classify whether the first exception message relates to a critical execution event. This machine learning model may be based on patterns in past training data (e.g., previously collected log data from the execution of other processes) or a set of rules for determining whether an exception message corresponds to a critical execution event.

At block 414, upon determining that the first execution event corresponding to the first exception message relates to the critical execution event, the computer system may modify the log data to add a critical indicator to the first exception message. In some cases, this may involve adding the "critical" flag or word to the first exception message.

At block 416, the computer system may compare the first exception type of the first exception message to the second exception type of the second exception message to determine if they are the same exception types. Since the first exception message has already been determined to correspond with a critical execution event, the second exception message may also be problematic if it has an exception type similar to that of the first exception message.

At block 418, the computer system may determine if the second execution event occurred after the first execution event. If this is the case, then it suggests that the second exception message was generated following the first exception message which was determined to correspond with a critical execution event. This, combined with the second execution type being similar to the first execution type, may suggest that the second exception message is somehow related to the first exception message (e.g., the second exception message arises out of the same error or fault). Thus, at block 420, the computer system may modify the log data to add an alert indicator to the second exception message since it could be related to the first exception message, which was found to be critical. This allows the second exception message to be highlighted (e.g., by an alert) for further review, even if the log management system has never seen the second exception message before or has trouble classifying the second exception message as critical. In other words, a second exception message that has never been seen before can be handled based on related exception messages that the log management system has successfully evaluated.

Figure 5:
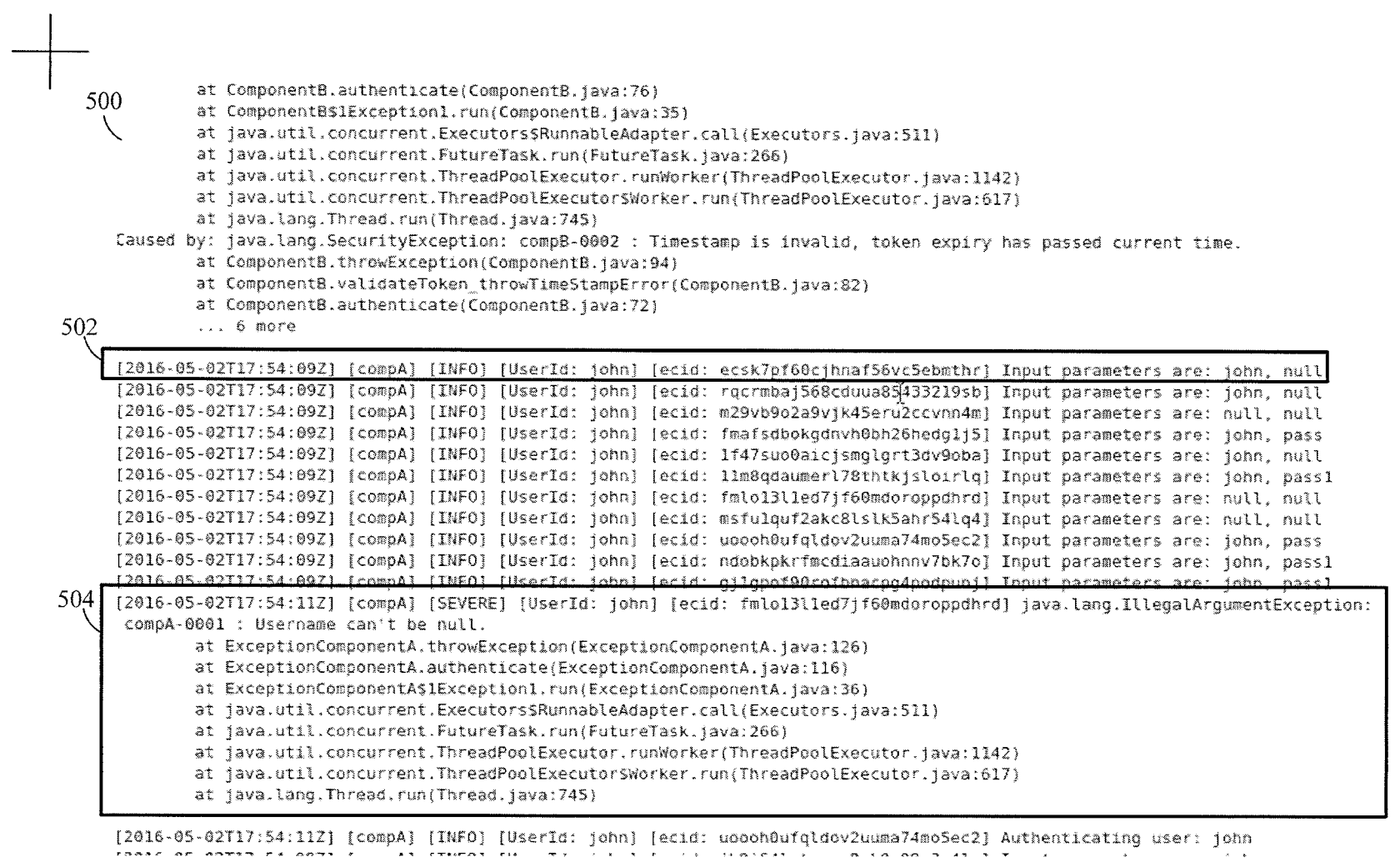

FIG. 5 illustrates a graphical user interface displaying log data by topic according to some embodiments of the present disclosure. It should be noted that the log data may be sent out to various kinds of storages, such as databases, file systems (e.g., log files), and so forth, where they can be later read and displayed (e.g., via similar graphical user interfaces).

The topic 500 may contain various messages including diagnostic messages and/or exception messages. Diagnostic message 502 is an example of a diagnostic message and exception message 504 is an example of an exception message.

As shown in the figure, the example diagnostic message 502 has a timestamp for when the message was generated, an identifier of the component that generated the message (e.g., compA), an identifier of the user (e.g., UserID:: john), an execution context identifier (ECID), and the actual diagnostic message itself (e.g., "Input parameters are: john, null"). So if this example diagnostic message 502 pertains to a user providing credentials for logging on, it can be seen from the actual diagnostic message itself that the user provided a username of "john" but did not provide a password ("null") as an input parameter.

As shown in the figure, the example exception message 504 also has a timestamp for when the message was generated, an identifier of the component that generated the message, an identifier of the user (e.g., the user that provided a service request), an ECID, and the actual exception message itself (e.g., "java.langIllegalArgumentException: compA: username can't be null). So if this example exception message 504 pertains to a user providing credentials for logging on, it can be seen from the actual exception message itself that an exception was triggered when the user failed to provide a username, and this exception message is of the type "IllegalArgumentException". Other exception messages with that type may have been generated in similar circumstances arising from faulty parameters or arguments being provided to the process.

Figure 6:
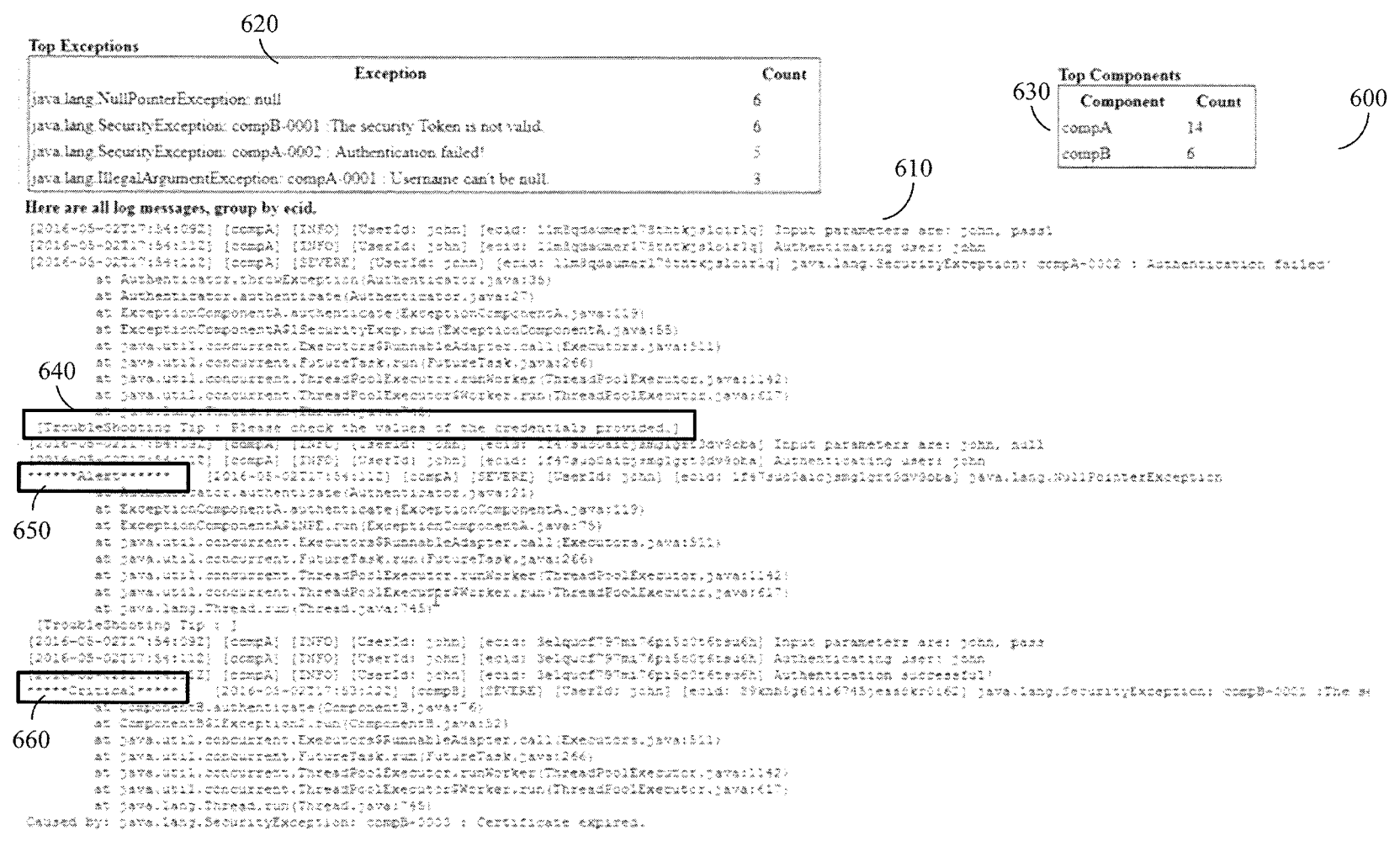

FIG. 6 illustrates a graphical user interface 600 displaying a portion of an output topic 610 according to some embodiments of the present disclosure.

In some embodiments, the output topic 610 may contain the various messages in the topic, such as error messages, diagnostic messages, and so forth. However, as shown in the figure, the messages of the output topic 610 may be grouped and displayed differently from the messages in the topic. In particular, the output topic 610 in the figure shows error messages that are grouped by their ECID. Accordingly, each block of error messages shown has error messages with the same ECID which means those error messages are associated with the same request.

In some embodiments, the output topic 610 may contain enrichments. These enrichments may be inserted directly into the contents of the output topic 610 (e.g., added to an error message) or they may be added to the headers or metadata of the output topic 610 for display by the graphical interface. The troubleshooting tip 640 is an example of an enrichment that has been added to an error message. In some embodiments, the log management system may check exception messages in the topic that have known solutions or troubleshooting tips (e.g., by consulting a knowledge source), and those exception messages may have troubleshooting tips added to them. For instance, troubleshooting tip 640 suggests to the user that the exception message of "javalang.SecurityException: compA-0002: Authentication failed!" was caused by the values of the credentials provided. This allows a reader of the output topic 610 to quickly diagnose and solve that problem without having to manually look up what the exception message means.

In some embodiments, the output topic 610 may contain analytics. These analytics may be inserted directly into the contents of the output topic 610 (e.g., added to an error message). Or the analytics may be added to the headers or metadata of the output topic 610 for display at the top of the graphical user interface 600. The top exceptions table 620 shown at the top of the graphical user interface 600 is an example of an analytic applied to the error messages. The top exceptions table 620 shows the frequency of the most common exception messages within the topic and it can be generated from querying the exception messages and counting the occurrences of each kind of exception message. Similarly, the top components table 630 shown at the top of the graphical user interface 600 is another example of an analytic applied to the error messages. The top components table 630 shows the frequency of the components involved with generating the error messages within the topic and it can be generated from querying the error messages and counting the occurrence of each component.

The alert indicator 650 and the critical indicator 660 are additional examples of analytics that can be applied to the error messages. These indicators can be applied to error messages based on a knowledge source or machine learning models configured for determining which error messages to apply the indicators to. For example, in some embodiments, there may be a machine learning model configured to determine if each exception message corresponds to an exception that is critical or non-critical. If an exception message corresponds to a critical exception, the critical indicator 610 can be added to that exception message so that it stands out in the output topic 610. In some cases, the alert indicator 650 may be added to new exception messages that have not been seen before.

Figure 7:
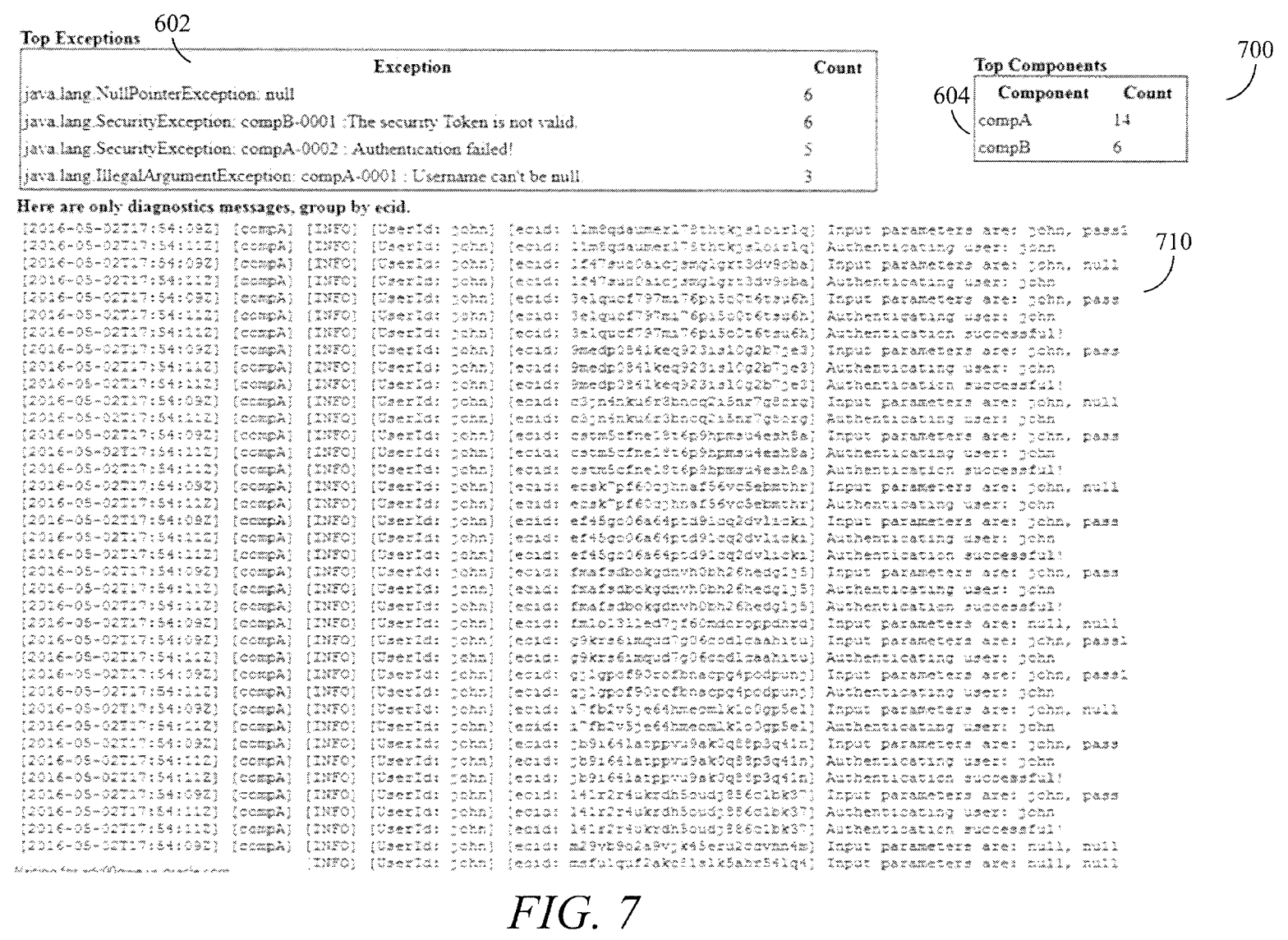

FIG. 7 illustrates a graphical user interface 700 displaying a portion of an output topic 710 according to some embodiments of the present disclosure.

The top of the graphical user interface 700 also shows the top exceptions table 620 and the top components table 630. In addition, the graphical user interface 700 shows an output topic 710 that contains only diagnostic messages, with the diagnostic messages grouped by their ECID. There may be similar features that allow only exception messages contained in the output topic 710 to be displayed, with those exception messages grouped by their ECID. The output topic 710 may be displayable with any suitable visual appearance.

In some embodiments, the diagnostic messages and the exception messages of the output topic 710 may be logged separately. Thus, the output topic 710 may actually consist of separate topics or the different kinds of error messages within the output topic 710 may be grouped together.

In some embodiments, the output topic 710 may modify the log data in order to aggregate, group, and/or enrich the log data to include additional information. For example, multiple executed processes having the same error may be grouped and identified for a user to quickly review. That way, the user can easily pick up on any similarities between those multiple processes, along with any other informational patterns, and quickly arrive at a diagnosis for the cause of that error. Or, as another example, a single process may encounter the same error multiple times and all of those errors can be grouped for the user to review. That way, the user can quickly determine what is causing the error with the process and figure out whether the problem is likely to be isolated to that process, or whether the problem can potentially be an issue for other processes or components.

Figure 8:
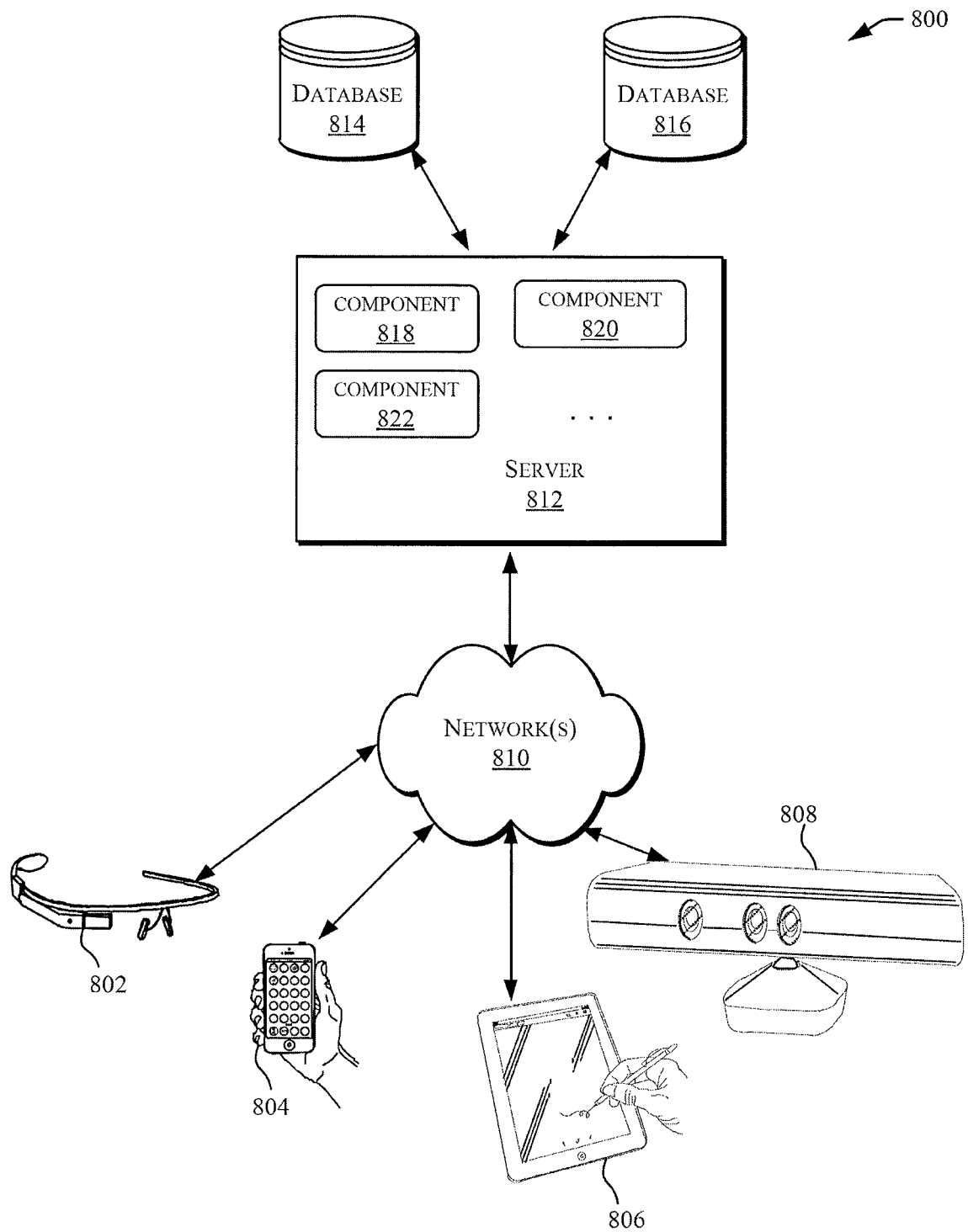
FIG. 8 depicts a simplified diagram of a distributed system for implementing some embodiments of the present disclosure.

FIG. 8 depicts a simplified diagram of a distributed system 800 for implementing some embodiments of the present disclosure. The distributed system 800 can implement embodiments of log message systems and/or log management systems, as previously discussed. In the illustrated embodiment, distributed system 800 includes one or more client computing devices 802, 804, 806, and 808, coupled to a server 812 via one or more communication networks 810. Clients computing devices 802, 804, 806, and 808 may be configured to execute one or more applications.

In various embodiments, server 812 may be adapted to run one or more services or software applications that enable the management of databases, as described in this disclosure. For example, in certain embodiments, server 812 may receive documents and user-defined schema. Server 812 may then perform compliance to ensure that the documents comply with the schema.

In certain embodiments, server 812 may also provide other services or software applications that can include non-virtual and virtual environments. In some embodiments, these services may be offered as web-based or cloud services, such as under a Software as a Service (SaaS) model to the users of client computing devices 802, 804, 806, and/or 808. Users operating client computing devices 802, 804, 806, and/or 808 may in turn utilize one or more client applications to interact with server 812 to utilize the services provided by these components.

In the configuration depicted in FIG. 8, server 812 may include one or more components 818, 820 and 822 that implement the functions performed by server 812. These components may include software components that may be executed by one or more processors, hardware components, or combinations thereof. It should be appreciated that various different system configurations are possible, which may be different from distributed system 800. The embodiment shown in FIG. 8 is thus one example of a distributed system for implementing an embodiment system and is not intended to be limiting.

Users may use client computing devices 802, 804, 806, and/or 808 to execute one or more applications, which may generate one or more requests that may then be serviced in accordance with the teachings of this disclosure. A client device may provide an interface that enables a user of the client device to interact with the client device. The client device may also output information to the user via this interface. Although FIG. 8 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 810 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 810 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 812 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 812 can include one or more virtual machines running virtual operating systems, or other computing architectures involving virtualization such as one or more flexible pools of logical storage devices that can be virtualized to maintain virtual storage devices for the server. In various embodiments, server 812 may be adapted to run one or more services or software applications that provide the functionality described in the foregoing disclosure.

The computing systems in server 812 may run one or more operating systems including any of those discussed above, as well as any commercially available server operating system. Server 812 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 812 may include one or more applications to analyze and consolidate data feeds and/or event updates received from users of client computing devices 802, 804, 806, and 808. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 812 may also include one or more applications to display the data feeds and/or real-time events via one or more display devices of client computing devices 802, 804, 806, and 808.

Distributed system 800 may also include one or more databases 814 and 816. The databases 814 and 816 may reside in a variety of locations. By way of example, one or more of the databases 814 and 816 may reside on a non-transitory storage medium local to (and/or resident in) server 812. Alternatively, the databases 814 and 816 may be remote from server 812 and in communication with server 812 via a network-based or dedicated connection. In one set of embodiments, the databases 814 and 816 may reside in a storage-area network (SAN). Similarly, any necessary files for performing the functions attributed to server 812 may be stored locally on server 812 and/or remotely, as appropriate. In one set of embodiments, the databases 814 and 816 may include databases that are adapted to store, update, and retrieve data in response to formatted commands, such as the commands with the syntax described herein.

Figure 9:
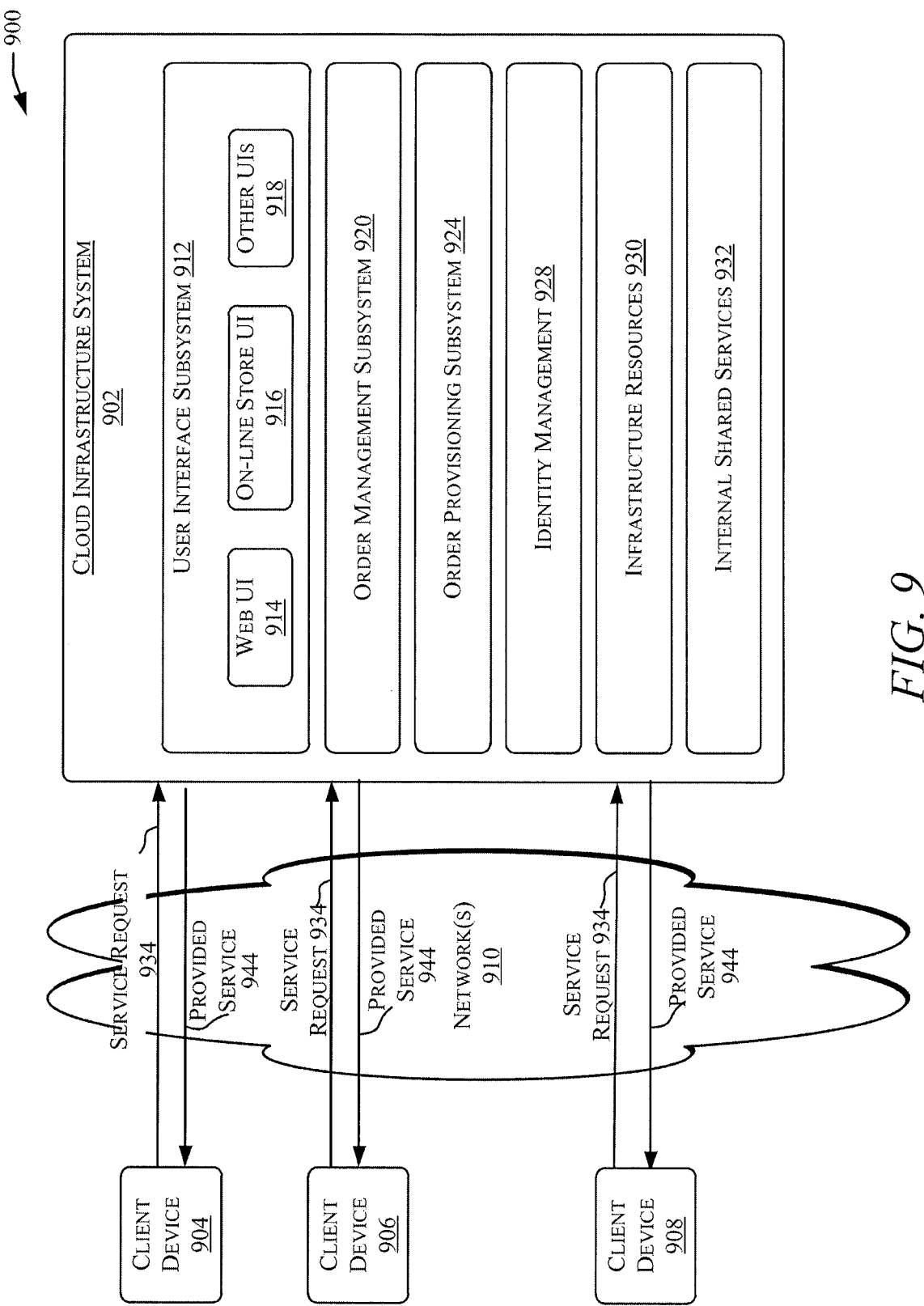
FIG. 9 is a simplified block diagram of a cloud-based system environment in which various storage-related services may be offered as cloud services, in accordance with certain embodiments of the present disclosure.

In certain embodiments, the storage-related functionalities described in this disclosure may be offered as services via a cloud environment. FIG. 9 is a simplified block diagram of a cloud-based system environment in which various storage-related services may be offered as cloud services, in accordance with certain embodiments of the present disclosure. In the embodiment depicted in FIG. 9, cloud infrastructure system 902 may provide one or more cloud services that may be requested by users using one or more client computing devices 904, 906, and 908. Cloud infrastructure system 902 may comprise one or more computers and/or servers that may include those described above for server 812. The computers in cloud infrastructure system 902 may be organized as general purpose computers, specialized server computers, server farms, server clusters, or any other appropriate arrangement and/or combination.

Network(s) 910 may facilitate communication and exchange of data between clients 904, 906, and 908 and cloud infrastructure system 902. Network(s) 910 may include one or more networks. The networks may be of the same or different types. Network(s) 910 may support one or more communication protocols, including wired and/or wireless protocols, for facilitating the communications.

The embodiment depicted in FIG. 9 is only one example of a cloud infrastructure system and is not intended to be limiting. It should be appreciated that, in some other embodiments, cloud infrastructure system 902 may have more or fewer components than those depicted in FIG. 9, may combine two or more components, or may have a different configuration or arrangement of components. For example, although FIG. 9 depicts three client computing devices, any number of client computing devices may be supported in alternative embodiments.

The term cloud service is generally used to refer to a service that is made available to users on demand and via a communication network such as the Internet by systems (e.g., cloud infrastructure system 902) of a service provider. Typically, in a public cloud environment, servers and systems that make up the cloud service provider's system are different from the customer's own on-premise servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain embodiments, cloud infrastructure system 902 may provide one or more cloud services using different models such as under a Software as a Service (SaaS) model, a Platform as a Service (PaaS) model, an Infrastructure as a Service (IaaS) model, and others, including hybrid service models. Cloud infrastructure system 902 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 302. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 902. Cloud infrastructure system 902 then performs processing to provide the services requested in the customer's subscription order. For example, a user may request the cloud infrastructure system to provide a database with a database management system. Cloud infrastructure system 902 may be configured to provide one or even multiple cloud services.

Cloud infrastructure system 902 may provide the cloud services via different deployment models. In a public cloud model, cloud infrastructure system 902 may be owned by a third party cloud services provider and the cloud services are offered to any general public customer, where the customer can be an individual or an enterprise. In certain other embodiments, under a private cloud model, cloud infrastructure system 902 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 902 and the services provided may be shared by several organizations in a related community. Various other models such as hybrids of the above mentioned models may also be used.

Client computing devices 904, 906, and 908 may be of different types (such as devices 802, 804, 806, and 808 depicted in FIG. 8) and may be capable of operating one or more client applications. A user may use a client device to interact with cloud infrastructure system 902, such as to request a service provided by cloud infrastructure system 902. For example, a user may use a client device to request a storage-related service described in this disclosure.

In some embodiments, the processing performed by cloud infrastructure system 902 for providing storage-related services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 302 for determining which storage virtual machine is to be selected for a particular application based upon the application's stated storage-related requirements. The data used for this analysis may include structured data (e.g., data stored in a database or structured according to a structured model) and/or unstructured data (e.g., data blobs (binary large objects)).

As depicted in the embodiment in FIG. 9, cloud infrastructure system 902 may include infrastructure resources 930 that are utilized for facilitating the provision of various cloud services offered by cloud infrastructure system 902. Infrastructure resources 930 may include, for example, processing resources, storage or memory resources, networking resources, and the like.

In certain embodiments, to facilitate efficient provisioning of these resources for supporting the various cloud services provided by cloud infrastructure system 902 for different customers, the resources may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 902 may itself internally use services 932 that are shared by different components of cloud infrastructure system 902 and which facilitate the provisioning of services by cloud infrastructure system 902. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 902 may comprise multiple subsystems. These subsystems may be implemented in software, or hardware, or combinations thereof. As depicted in FIG. 9, the subsystems may include a graphical interface subsystem 912 that enables users or customers of cloud infrastructure system 902 to interact with cloud infrastructure system 902. Graphical interface subsystem 912 may include various different interfaces such as a web interface 914, an online store interface 916 where cloud services provided by cloud infrastructure system 902 are advertised and are purchasable by a consumer, and other interfaces 918. For example, a customer may, using a client device, request (service request 934) one or more services provided by cloud infrastructure system 902 using one or more of interfaces 914, 916, and 918. For example, a customer may access the online store, browse cloud services offered by cloud infrastructure system 902, and place a subscription order for one or more services offered by cloud infrastructure system 902 that the customer wishes to subscribe to. The service request may include information identifying the customer and one or more services that the customer desires to subscribe to. For example, a customer may place a subscription order for a storage-related service offered by cloud infrastructure system 902. As part of the order, the customer may provide information identifying an application for which the service is to be provided and the application storage profile information for the application.

In certain embodiments, such as the embodiment depicted in FIG. 9, cloud infrastructure system 902 may comprise an order management subsystem (OMS) 920 that is configured to process the new order. As part of this processing, OMS 920 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 920 may then invoke the order provisioning subsystem (OPS) 924 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 924 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 902 may send a response or notification 944 to the requesting customer to indicate when the requested service is now ready for use. In some instances, information (e.g., a link) may be sent to the customer that enables the customer to start using and availing the benefits of the requested services.

Cloud infrastructure system 902 may provide services to multiple customers. For each customer, cloud infrastructure system 902 is responsible for managing information related to one or more subscription orders received from the customer, maintaining customer data related to the orders, and providing the requested services to the customer. Cloud infrastructure system 902 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 902 may provide services to multiple customers in parallel. Cloud infrastructure system 902 may store information for these customers, including possibly proprietary information. In certain embodiments, cloud infrastructure system 902 comprises an identity management subsystem (IMS) 928 that is configured to manage customers information and provide the separation of the managed information such that information related to one customer is not accessible by another customer. IMS 928 may be configured to provide various security-related services such as identity services, such as information access management, authentication and authorization services, services for managing customer identities and roles and related capabilities, and the like.

Figure 10:
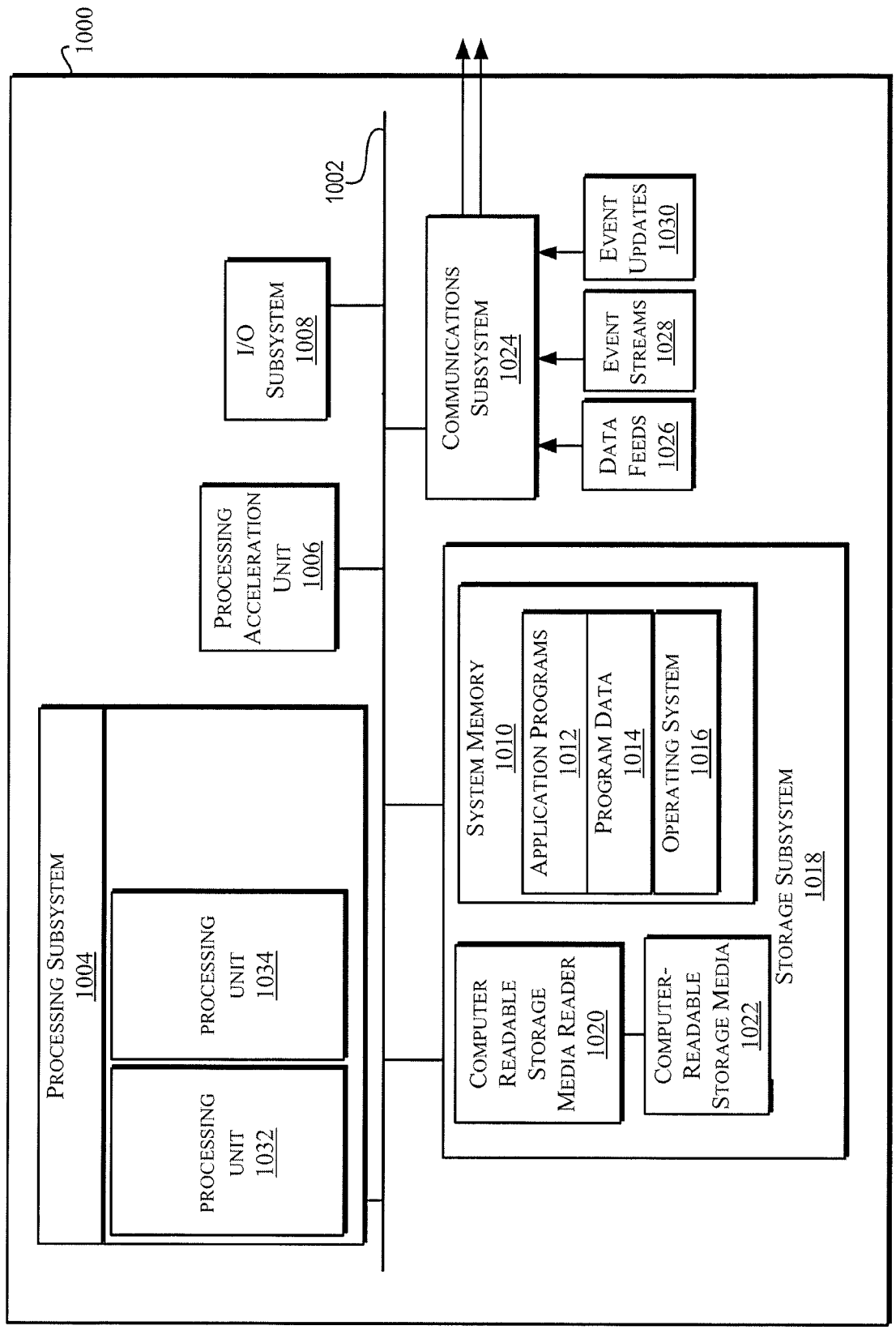
FIG. 10 illustrates an exemplary computer system that may be used to implement certain embodiments of the present disclosure.

FIG. 10 illustrates an exemplary computer system 1000 that may be used to implement certain embodiments of the present disclosure. For example, in some embodiments, computer system 1000 may be used to implement the log message system and/or log management system. For example, all or some of the elements of the computing system 100 illustrated in FIG. 1 can be included or implemented in the system 1000. As shown in FIG. 10, computer system 1000 includes various subsystems including a processing subsystem 1004 that communicates with a number of other subsystems via a bus subsystem 1002. These other subsystems may include a processing acceleration unit 1006, an I/O subsystem 1008, a storage subsystem 1018, and a communications subsystem 1024. Storage subsystem 1018 may include non-transitory computer-readable storage media including storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1004 controls the operation of computer system 1000 and may comprise one or more processors, application specific integrated circuits (ASICs), or field programmable gate arrays (FPGAs). These processors may be single core or multicore processors. The processing resources of computer system 1000 can be organized into one or processing units 1032, 1034, etc. A processing unit may include one or more processors, one or more cores from the same or different processors, a combination of cores and processors, or other combinations of cores and processors. In some embodiments, processing subsystem 1004 can include one or more special purpose co-processors such as graphics processors, digital signal processors (DSPs), or the like. In some embodiments, some or all of the processing units of processing subsystem 1004 can be implemented using customized circuits, such as application specific integrated circuits (ASICs), or field programmable gate arrays (FPGAs).

In some embodiments, the processing units in processing subsystem 1004 can execute instructions stored in system memory 1010 or on computer readable storage media 1022. In various embodiments, the processing units can execute a variety of programs or code instructions and can maintain multiple concurrently executing programs or processes. At any given time, some or all of the program code to be executed can be resident in system memory 1010 and/or on computer-readable storage media 1022 including potentially on one or more storage devices. Through suitable programming, processing subsystem 1004 can provide various functionalities described above. In instances where computer system 1000 is executing one or more virtual machines, one or more processing units may be allocated to each virtual machine.

In certain embodiments, a processing acceleration unit 1006 may optionally be provided for performing customized processing or for off-loading some of the processing performed by processing subsystem 404 so as to accelerate the overall processing performed by computer system 1000.

I/O subsystem 1008 may include devices and mechanisms for inputting information to computer system 1000 and/or for outputting information from or via computer system 1000. In general, use of the term input device is intended to include all possible types of devices and mechanisms for inputting information to computer system 1000. Graphical interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Graphical interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. Graphical interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, graphical interface input devices may include voice recognition sensing devices that enable users to interact with voice recognition systems (e.g., Siri® navigator) through voice commands.

Other examples of graphical interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, graphical interface input devices may include, for example, medical imaging input devices such as computed tomography, magnetic resonance imaging, position emission tomography, and medical ultrasonography devices. Graphical interface input devices may also include, for example, audio input devices such as MIDI keyboards, digital musical instruments and the like.

In general, use of the term output device is intended to include all possible types of devices and mechanisms for outputting information from computer system 1000 to a user or other computer. Graphical interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, graphical interface output devices may include, without limitation, a variety of display devices that visually convey text, graphics and audio/video information such as monitors, printers, speakers, headphones, automotive navigation systems, plotters, voice output devices, and modems.

Storage subsystem 1018 provides a repository or data store for storing information and data that is used by computer system 1000. Storage subsystem 1018 provides a tangible non-transitory computer-readable storage medium for storing the basic programming and data constructs that provide the functionality of some embodiments. Storage subsystem 1018 may store software (e.g., programs, code modules, instructions) that when executed by processing subsystem 1004 provides the functionality described above. The software may be executed by one or more processing units of processing subsystem 1004. Storage subsystem 1018 may also provide a repository for storing data used in accordance with the teachings of this disclosure.

Storage subsystem 1018 may include one or more non-transitory memory devices, including volatile and non-volatile memory devices. As shown in FIG. 10, storage subsystem 1018 includes a system memory 1010 and a computer-readable storage media 1022. System memory 1010 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1000, such as during start-up, may typically be stored in the ROM. The RAM typically contains data and/or program modules that are presently being operated and executed by processing subsystem 1004. In some implementations, system memory 1010 may include multiple different types of memory, such as static random access memory (SRAM), dynamic random access memory (DRAM), and the like.

By way of example, and not limitation, as depicted in FIG. 10, system memory 1010 may load application programs 1012 that are being executed, which may include various applications such as Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 1022 may store programming and data constructs that provide the functionality of some embodiments. Computer-readable media 1022 may provide storage of computer-readable instructions, data structures, program modules, and other data for computer system 1000. Software (programs, code modules, instructions) that, when executed by processing subsystem 1004 provides the functionality described above, may be stored in storage subsystem 1018. By way of example, computer-readable storage media 1022 may include non-volatile memory such as a hard disk drive, a magnetic disk drive, an optical disk drive such as a CD ROM, DVD, a Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 1018 may also include a computer-readable storage media reader 1020 that can further be connected to computer-readable storage media 1022. Reader 1020 may receive and be configured to read data from a memory device such as a disk, a flash drive, etc.

In certain embodiments, computer system 1000 may support virtualization technologies, including but not limited to virtualization of processing and memory resources. For example, computer system 1000 may provide support for executing one or more virtual machines. In certain embodiments, computer system 1000 may execute a program such as a hypervisor that facilitates the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1000. Accordingly, multiple operating systems may potentially be run concurrently by computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to establish a communication channel to one or more client devices via the Internet for receiving and sending information from and to the client devices. For example, when computer system 1000 is used to implement the computer system 100 depicted in FIG. 1, the communication subsystem may be used to communicate with the client systems.

Communication subsystem 1024 may support both wired and/or wireless communication protocols. For example, in certain embodiments, communications subsystem 1024 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

Communication subsystem 1024 can receive and transmit data in various forms. For example, in some embodiments, in addition to other forms, communications subsystem 1024 may receive input communications in the form of structured and/or unstructured data feeds 1026, event streams 1028, event updates 1030, and the like. For example, communications subsystem 1024 may be configured to receive (or send) data feeds 1026 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1024 may be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

Communications subsystem 1024 may also be configured to communicate data from computer system 1000 to other computer systems or networks. The data may be communicated in various different forms such as structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 1000 depicted in FIG. 10 is intended only as a specific example. Many other configurations having more or fewer components than the system depicted in FIG. 10 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A computer-implemented method comprising:
   reading, by a log management system, a topic retrieved from a log message system, wherein: the topic comprises error messages that were generated by physical and/or virtual nodes of a distributed computer system while executing processes, the topic is a centralized log file, the physical and/or virtual nodes write the error messages to the topic, the processes are executed in response to, or associated with, application processing requests received by the physical and/or virtual nodes, and each of the error messages are associated with an execution context identifier (ECID) used to correlate events associated with a same application processing request across multiple physical and/or virtual nodes;
   identifying, by the log management system, an error message of the error messages in the topic;
   applying, by the log management system, an enrichment to the error message, wherein the enrichment is a known solution or troubleshooting tip associated with the error message;
   analyzing, by the log management system, the error message, wherein the analyzing comprises classifying, by a machine-learning model, the error message, and generating analytics associated with the error message based on the classifying;
   determining, by the log management system, that the error message is a specific type of error message, based on the analytics;
   in response to determining that the error message is the specific type, determining, by the log management system, a node of the one or more physical and/or virtual nodes that generated the error message;
   communicating, by the log management system, instructions to the node to stop one or more of the processes that generated the error message;
   updating, by the log management system, the machine-learning model based on the error message, the enrichments, and the analytics, wherein the updating comprises retraining the machine learning model using the error message, the enrichments, and the analytics as training data;
   generating, by the log management system, an output topic that includes the error message in association with the enrichments and the analytics, wherein the generating comprises grouping the error message with other error messages generated in the same application processing request based on the ECID associated with the error message and the other error messages; and
   displaying the output topic through a graphical interface.

2. The method of claim 1, further comprising storing, by the log management system, the output topic in a storage device.

3. The method of claim 1, wherein the analyzing further comprises performing queries of the error message to obtain counts or statistics associated with the error message, and the analytics associated with the error message are generated based on the classifying and the counts or statistics.

4. The method of claim 1, further comprising determining, by the log management system, a type of exception associated with the error message, wherein the enrichment is applied based on the type of exception associated with the error message.

5. A non-transitory computer-readable memory storing a plurality of instructions executable by one or more processors, the plurality of instructions comprising instructions that when executed by the one or more processors cause the one or more processors to perform processing comprising:
   reading a topic retrieved from a log message system, wherein: the topic comprises error messages that were generated by physical and/or virtual nodes of a distributed computer system while executing processes, the topic is a centralized log file, the physical and/or virtual nodes write the error messages to the topic, the processes are executed in response to, or associated with, application processing requests received by the physical and/or virtual nodes, and each of the error messages are associated with an execution context identifier (ECID) used to correlate events associated with a same application processing request across multiple physical and/or virtual nodes;
   identifying an error message of the error messages in the topic;
   applying an enrichment to the error message or content of the topic, wherein the enrichment is a known solution or troubleshooting tip associated with the error message;
   analyzing the error message, wherein the analyzing comprises classifying, by a machine-learning model, the error message, and generating analytics associated with the error message based on the classifying;
   determining that the error message is a specific type of error message, based on the analytics;

in response to determining that the error message is the specific type, determining a node of the one or more physical and/or virtual nodes that generated the error message;
communicating instructions to the node to stop one or more of the processes that generated the error message;
updating the machine-learning model based on the error message, the enrichments, and the analytics, wherein the updating comprises retraining the machine learning model using the error message, the enrichments, and the analytics as training data;
generating an output topic that includes the error message, the enrichments, and the analytics, wherein the generating comprises grouping the error message with other error messages generated in the same application processing request based on the ECID associated with the error message and the other error messages; and
displaying the output topic through a graphical interface.

6. The non-transitory computer-readable memory of claim 5, wherein the processing further comprises storing the output topic in a storage device.

7. The non-transitory computer-readable memory of claim 5, wherein the analyzing further comprises performing queries of the error message to obtain counts or statistics associated with the error message, and the analytics associated with the error message are generated based on the classifying and the counts or statistics.

8. The non-transitory computer-readable memory of claim 5, wherein the processing further comprises determining a type of exception associated with the error message, wherein the enrichment is applied based on the type of exception associated with the error message.

9. A system comprising:
one or more processors;
a memory coupled to the one or more processors, the memory storing a plurality of instructions executable by the one or more processors, the plurality of instructions comprising instructions that when executed by the one or more processors cause the one or more processors to perform processing comprising:
reading a topic retrieved from a log message system, wherein: the topic comprises error messages that were generated by physical and/or virtual nodes of a distributed computer system while executing processes, the topic is a centralized log file, the physical and/or virtual nodes write the error messages to the topic, the processes are executed in response to, or associated with, application processing requests received by the physical and/or virtual nodes, and each of the error messages are associated with an execution context identifier (ECID) used to correlate events associated with a same application processing request across multiple physical and/or virtual nodes;
identifying an error message of the error messages in the topic;
applying an enrichment to the error message or content of the topic, wherein the enrichment is a known solution or troubleshooting tip associated with the error message;
analyzing the error message, wherein the analyzing comprises classifying, by a machine-learning model, the error message, and generating analytics associated with the error message based on the classifying;
determining that the error message is a specific type of error message, based on the analytics;
in response to determining that the error message is the specific type, determining a node of the one or more physical and/or virtual nodes that generated the error message;
communicating instructions to the node to stop one or more of the processes that generated the error message;
updating the machine-learning model based on the error message, the enrichments, and the analytics, wherein the updating comprises retraining the machine learning model using the error message, the enrichments, and the analytics as training data;
generating an output topic that includes the error message, the enrichments, and the analytics, wherein the generating comprises grouping the error message with other error messages generated in the same application processing request based on the ECID associated with the error message and the other error messages; and
displaying the output topic through a graphical interface.

10. The system of claim 9, wherein the processing further comprises storing the output topic in a storage device.

11. The system of claim 9, wherein the analyzing further comprises performing queries of the error message to obtain counts or statistics associated with the error message, and the analytics associated with the error message are generated based on the classifying and the counts or statistics.

* * * * *